United States Patent
Gupta et al.

(10) Patent No.: US 9,668,030 B2
(45) Date of Patent: May 30, 2017

(54) SYNCHRONIZATION OF INTERACTIVITY WITH LINEAR ADVERTISEMENT IN A MOBILE BROADCAST NETWORK

(75) Inventors: Binita Gupta, San Diego, CA (US); Eitan Pilipski, San Diego, CA (US); Rajkumar Pitchaimani, San Diego, CA (US); Nagaraju Naik, San Diego, CA (US); Qi Xue, San Diego, CA (US); Carla L. Riney, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1081 days.

(21) Appl. No.: 12/769,503

(22) Filed: Apr. 28, 2010

(65) Prior Publication Data

US 2011/0270653 A1 Nov. 3, 2011

(51) Int. Cl.
*G06Q 30/02* (2012.01)
*H04N 5/44* (2011.01)
(Continued)

(52) U.S. Cl.
CPC ....... *H04N 21/812* (2013.01); *G06Q 30/0241* (2013.01); *H04N 21/4722* (2013.01); *H04N 21/858* (2013.01); *H04N 21/8545* (2013.01)

(58) Field of Classification Search
CPC . G06Q 30/02; H04N 5/44543; H04N 7/17318
(Continued)

(56) References Cited

U.S. PATENT DOCUMENTS 7,962,573 B2   6/2011  Connelly
2001/0037507 A1*  11/2001  Mori ............................... 725/97
(Continued)

FOREIGN PATENT DOCUMENTS

GB           2365586 A        2/2002

OTHER PUBLICATIONS

International Search Report and Written Opinion—PCT/US2011/034187, International Search Authority—European Patent Office—Aug. 19, 2011.

*Primary Examiner* — Sun Li
(74) *Attorney, Agent, or Firm* — The Marbury Law Group, PLLC

(57) ABSTRACT

Methods, systems, and apparatus for synchronizing interactive advertisements with linear advertisements, including: a traffic module configured to generate advertisement schedule information about slots for linear advertisements on channels; an automation module configured to detect cue messages in real-time media, each cue message indicating a respective start time and a respective index of a respective slot for respective linear advertisements, and to forward information about the cue messages; and an interactivity production module configured to receive the advertisement schedule information, the information about the cue messages, and information about interactive sequences, each interactive sequence to be synchronized with a respective spot for an associated linear advertisement, to generate an interactivity event for each respective interactive sequence, to calculate a start time for each respective interactivity event using information about a respective associated cue message, and to forward an activation message with the respective start time for each respective interactivity event.

57 Claims, 7 Drawing Sheets

(51) Int. Cl.
*H04N 7/173* (2011.01)
*H04N 21/81* (2011.01)
*H04N 21/4722* (2011.01)
*H04N 21/8545* (2011.01)
*H04N 21/858* (2011.01)

(58) Field of Classification Search
USPC ........ 705/14.4; 725/97, 101, 13, 116, 42, 98
See application file for complete search history.

(56) References Cited

U.S. PATENT DOCUMENTS

| | | |
|---|---|---|
| 2002/0124255 A1 | 9/2002 | Reichardt et al. |
| 2004/0010806 A1* | 1/2004 | Yuen et al. .................... 725/136 |
| 2006/0215999 A1 | 9/2006 | Kang et al. |
| 2008/0300983 A1* | 12/2008 | Chen et al. .................... 705/14 |
| 2010/0169932 A1 | 7/2010 | Grubb et al. |
| 2010/0175080 A1 | 7/2010 | Yuen et al. |

* cited by examiner

- (A) IPM receives Ad Schedule from TS
- (B) Operator creates an iSeq for an iAd
- (C) Operator associates iSeq with Ad Spot
- (D) IPM push iSeq content info to IG
- (E) IPM receives cue message from AM
- (F) IPM finds matching Ad Window, Ad Avail
- (G) IPM computes start time of any Ad iSeqs
- (H) IPM sends iSeq activation message to IG

SYNCHRONIZATION OF INTERACTIVITY WITH LINEAR ADVERTISEMENT IN A MOBILE BROADCAST NETWORK

BACKGROUND

A content delivery system can be or include a wireless content delivery system, such as the MediaFLO™ system developed by QUALCOMM Incorporated of San Diego, Calif. The content delivery system can be or include a content delivery platform based on wired or optical connections, in addition to or instead of a wireless interface. In general, the content delivered by the content delivery system can include video media, such as video clips encoded in the Real™ format, the Motion Pictures Group (.mpg) format, the Windows Media format by Microsoft Corporation, or other video codec or format. The content can include audio media, such as music tracks or broadcast recordings encoded in Motion Pictures Expert Group (MPEG)-1 Audio Layer 3 (MP3) format, Microsoft Corp. ".wav" format, RealAudio™ format, or other audio codec or format. The content can further include textual content, such as streaming stock quotes, weather reports, or other data.

The content delivered by the content delivery system can further include advertisement content that is one or more of video, audio, and textual content. For example, a linear video or audio advertisement can be broadcast at appropriate times (e.g., during advertisement breaks) as part of a video or audio content media stream of the content delivery system (e.g., a mobile broadcast network). A linear advertisement can be provided with a real-time media feed, e.g., from a content provider, or inserted into a real-time media feed, e.g., by a network operation center of the content delivery system.

SUMMARY

An example of a communications system configured to synchronize interactive advertisements with linear advertisements according to the disclosure includes: a traffic module configured to generate advertisement schedule information about slots for linear advertisements on one or more channels of the communications system; an automation module communicatively coupled to the traffic module and configured to detect one or more cue messages in real-time media, each cue message indicating a respective start time and a respective index of a respective slot for one or more respective linear advertisements, and to forward information about the one or more cue messages; and an interactivity production module communicatively coupled to the traffic module and the automation module and configured to receive the advertisement schedule information from the traffic module, to receive information about one or more interactive sequences, each interactive sequence to be synchronized with a respective spot for an associated linear advertisement, to generate an interactivity event for each respective interactive sequence, to receive the information about the one or more cue messages from the automation module, to calculate a start time for each respective interactivity event using information about a respective associated cue message, and to forward an activation message with the respective start time for each respective interactivity event.

Embodiments of such a system may include one or more of the following features. The system can further include an interactivity server communicatively coupled to the interactivity production module and configured to receive each activation message from the interactivity production module, and to calculate an updated start time for each respective interactivity event using the respective start time in the respective activation message and a media delay through the communications system. The automation module can be further configured to generate a cue cancel message when insertion of a linear advertisement fails, and to forward the cue cancel message to the interactivity production module. The interactivity production module can be further configured to forward a cancelation message to an interactivity server to cancel an interactivity event based on a cue cancel message received from the automation module, an instruction to cancel an interactive sequence received from an operator, or automatic cancelation of an interactive sequence instance.

The advertisement schedule can include one or more windows for linear advertisements, one or more slots for linear advertisements in each window, and one or more spots for linear advertisements in each slot; and the interactivity production module can be further configured to associate each cue message with a respective slot for linear advertisements in a respective window of the advertisement schedule based on the respective start time and the respective index indicated in the respective cue message, and to calculate the start time for each respective interactivity event for each respective interactive sequence to be synchronized with a respective spot for an associated linear advertisement in the respective slot for linear advertisements in the respective window of the advertisement schedule. The advertisement schedule can indicate that interactivity can be played on top of a spot for a linear advertisement by indicating a type of the spot as interactive. The interactivity production module can calculate the start time for each respective interactivity event for each respective interactive sequence to be synchronized with the respective spot for the associated linear advertisement using an offset, specified by an operator, from a respective start time of the respective spot for the associated linear advertisement.

The interactivity production module can be further configured to enable an operator to associate an interactive sequence with a respective linear advertisement, to enable the operator to create a scene template for the interactive sequence, to enable the operator to specify timing information for the interactive sequence, to generate the interactivity event for the interactive sequence using the scene template and the specified timing information, and to forward information about the interactive sequence after the operator indicates that the interactive sequence is ready to distribute. The interactivity production module also can be configured to enable the operator to associate the interactive sequence with the respective linear advertisement if a spot for the respective linear advertisement in the advertisement schedule has an interactive type. The interactivity production module can forward updated information about an updated interactive sequence to an interactivity server. The scene template for the interactive sequence includes one or more of Click-to-SMS, Click-for-Info, Click-to-Web, and Click-to-Call templates. The interactivity production module can be further configured to enable the operator to configure the interactive sequence for supporting interactivity with a single instance of the associated linear advertisement. The interactivity production module also can be further configured to enable the operator to cancel a previously created interactive sequence.

The interactivity production module also can enable the operator to configure an interactive sequence template for supporting interactivity for recurring instances of the associated linear advertisement by specifying a linear advertisement identifier for the interactive sequence template. The interactivity production module can create, automatically, interactive sequence instances for the interactive sequence template for spots for the associated linear advertisement in the advertisement schedule, the spots having a linear advertisement identifier that matches the linear advertisement identifier specified for the interactive sequence template. A network name can be specified for the interactive sequence template; and the interactivity production module can be further configured to determine the spots for creating automatically the interactive sequence instances as the spots having a linear advertisement identifier that matches the linear advertisement identifier specified for the interactive sequence template and a network name that matches the network name specified for the interactive sequence template. The interactivity production module also can be further configured to enable the operator to cancel a previously created interactive sequence instance for the interactive sequence template.

The interactivity production module also can create, automatically, interactive sequence instances for the interactive sequence template when new or updated advertisement schedule information is received from the traffic module for spots for the associated linear advertisement in the new or updated advertisement schedule, the spots having a linear advertisement identifier that matches the linear advertisement identifier specified for the interactive sequence template. In addition, the interactivity production module can cancel, automatically, interactive sequence instances previously created for the interactive sequence template for spots for the associated linear advertisement in a present advertisement schedule that are not included as spots for the associated linear advertisement in the new or updated advertisement schedule.

An example of a method of synchronizing interactive advertisements with linear advertisements in a communications system includes: receiving advertisement schedule information about slots for linear advertisements on one or more channels of the communications system; receiving information about one or more cue messages, the one or more cue messages detected in real-time media, each cue message indicating a respective start time and a respective index of a respective slot for one or more respective linear advertisements; receiving information about one or more interactive sequences, each interactive sequence to be synchronized with a respective spot for an associated linear advertisement; generating an interactivity event for each respective interactive sequence; calculating a start time for each respective interactivity event using information about a respective associated cue message; and forwarding an activation message with the respective start time for each respective interactivity event.

Embodiments of such a method may include one or more of the following features. The method can include calculating an updated start time for each respective interactivity event using the respective start time in each respective activation message and a media delay through the communications system. The method also can include receiving a cue cancel message generated when insertion of a linear advertisement fails. In addition, the method can include forwarding a cancelation message to cancel an interactivity event based on a received cue cancel message, an instruction to cancel an interactive sequence received from an operator, or automatic cancelation of an interactive sequence instance.

The advertisement schedule can include one or more windows for linear advertisements, one or more slots for linear advertisements in each window, and one or more spots for linear advertisements in each slot; the method can further include associating each cue message with a respective slot for linear advertisements in a respective window of the advertisement schedule based on the respective start time and the respective index indicated in the respective cue message; and calculating the start time for each respective interactivity event can include calculating the start time for each respective interactivity event for each respective interactive sequence to be synchronized with a respective spot for an associated linear advertisement in the respective slot for linear advertisements in the respective window of the advertisement schedule, the respective slot associated with the respective cue message. The advertisement schedule can indicate that interactivity can be played on top of a spot for a linear advertisement by indicating a type of the spot as interactive. Calculating the start time for each respective interactivity event can include calculating the start time for each respective interactivity event for each respective interactive sequence to be synchronized with the respective spot for the associated linear advertisement using an offset, specified by an operator, from a respective start time of the respective spot for the associated linear advertisement.

The method also can include: enabling an operator to associate an interactive sequence with a respective linear advertisement; enabling the operator to create a scene template for the interactive sequence; enabling the operator to specify timing information for the interactive sequence; and forwarding information about the interactive sequence after the operator indicates that the interactive sequence is ready to distribute, wherein generating the interactivity event for an interactive sequence further includes generating the interactivity event for the interactive sequence using the scene template and the specified timing information. Enabling the operator to associate the interactive sequence with the respective linear advertisement can include enabling the operator to associate the interactive sequence with the respective linear advertisement if a spot for the respective linear advertisement in the advertisement schedule has an interactive type. The method can further include forwarding updated information about an updated interactive sequence. The scene template for the interactive sequence may include one or more of Click-to-SMS, Click-for-Info, Click-to-Web, and Click-to-Call templates. The method can further include enabling the operator to configure the interactive sequence for supporting interactivity with a single instance of the associated linear advertisement. The method also can include enabling the operator to cancel a previously created interactive sequence.

The method can include enabling the operator to configure an interactive sequence template for supporting interactivity for recurring instances of the associated linear advertisement by specifying a linear advertisement identifier for the interactive sequence template. The method can include creating, automatically, interactive sequence instances for the interactive sequence template for spots for the associated linear advertisement in the advertisement schedule, the spots having a linear advertisement identifier that matches the linear advertisement identifier specified for the interactive sequence template. A network name can be specified for the interactive sequence template; and the method can include determining the spots for creating, automatically, the interactive sequence instances as the spots having a linear advertisement identifier that matches the linear advertisement identifier specified for the interactive sequence template and a network name that matches the network name specified for the interactive sequence template. The method also can include enabling the operator to cancel a previously created interactive sequence instance for the interactive sequence template.

Creating automatically interactive sequence instances can include creating, automatically, interactive sequence instances for the interactive sequence template when new or updated advertisement schedule information is received for spots for the associated linear advertisement in the new or updated advertisement schedule, the spots having a linear advertisement identifier that matches the linear advertisement identifier specified for the interactive sequence template. The method can further include canceling automatically interactive sequence instances previously created for the interactive sequence template for spots for the associated linear advertisement in a present advertisement schedule that are not included as spots for the associated linear advertisement in the new or updated advertisement schedule.

An example of a computer program product includes a processor-readable medium storing processor-readable instructions configured to cause a processor to: receive advertisement schedule information about slots for linear advertisements on one or more channels of a communications system; receive information about one or more cue messages, the one or more cue messages detected in real-time media, each cue message indicating a respective start time and a respective index of a respective slot for one or more respective linear advertisements; receive information about one or more interactive sequences, each interactive sequence to be synchronized with a respective spot for an associated linear advertisement; generate an interactivity event for each respective interactive sequence; calculate a start time for each respective interactivity event using information about a respective associated cue message; and forward an activation message with the respective start time for each respective interactivity event.

Embodiments of such a product may include one or more of the following features. The instructions can be configured to cause the processor to calculate an updated start time for each respective interactivity event using the respective start time in each respective activation message and a media delay through the communications system. The instructions can be further configured to cause the processor to receive a cue cancel message generated when insertion of a linear advertisement fails. The instructions also can cause the processor to forward a cancelation message to cancel an interactivity event based on a received cue cancel message, an instruction to cancel an interactive sequence received from an operator, or automatic cancelation of an interactive sequence instance.

The advertisement schedule can include one or more windows for linear advertisements, one or more slots for linear advertisements in each window, and one or more spots for linear advertisements in each slot; the instructions can be further configured to cause the processor to associate each cue message with a respective slot for linear advertisements in a respective window of the advertisement schedule based on the respective start time and the respective index indicated in the respective cue message; and the instructions can be configured to cause the processor to calculate the start time for each respective interactivity event are configured to cause the processor to calculate the start time for each respective interactivity event for each respective interactive sequence to be synchronized with a respective spot for an associated linear advertisement in the respective slot for linear advertisements in the respective window of the advertisement schedule, the respective slot associated with the respective cue message. The advertisement schedule can indicate that interactivity can be played on top of a spot for a linear advertisement by indicating a type of the spot as interactive. The instructions can be configured to cause the processor to calculate the start time for each respective interactivity event are configured to cause the processor to calculate the start time for each respective interactivity event for each respective interactive sequence to be synchronized with the respective spot for the associated linear advertisement using an offset, specified by an operator, from a respective start time of the respective spot for the associated linear advertisement.

The instructions also can be configured to cause the processor to: enable an operator to associate an interactive sequence with a respective linear advertisement; enable the operator to create a scene template for the interactive sequence; enable the operator to specify timing information for the interactive sequence; and forward information about the interactive sequence after the operator indicates that the interactive sequence is ready to distribute, wherein the instructions configured to cause the processor to generate the interactivity event for an interactive sequence are configured to cause the processor to generate the interactivity event for the interactive sequence using the scene template and the specified timing information. The instructions configured to cause the processor to enable the operator to associate the interactive sequence with the respective linear advertisement can be configured to cause the processor to enable the operator to associate the interactive sequence with the respective linear advertisement if a spot for the respective linear advertisement in the advertisement schedule has an interactive type. The instructions can be further configured to cause the processor to forward updated information about an updated interactive sequence. The scene template for the interactive sequence may include one or more of Click-to-SMS, Click-for-Info, Click-to-Web, and Click-to-Call templates. The instructions can be further configured to cause the processor to enable the operator to configure the interactive sequence for supporting interactivity with a single instance of the associated linear advertisement. The instructions also can be configured to cause the processor to enable the operator to cancel a previously created interactive sequence.

The instructions can be further configured to cause the processor to enable the operator to configure an interactive sequence template for supporting interactivity for recurring instances of the associated linear advertisement by specifying a linear advertisement identifier for the interactive sequence template. The instructions also can be configured to cause the processor to create automatically interactive sequence instances for the interactive sequence template for spots for the associated linear advertisement in the advertisement schedule, the spots having a linear advertisement identifier that matches the linear advertisement identifier specified for the interactive sequence template. A network name can be specified for the interactive sequence template; and the instructions can cause the processor to determine the spots for creating automatically the interactive sequence instances as the spots having a linear advertisement identifier that matches the linear advertisement identifier specified for the interactive sequence template and a network name that matches the network name specified for the interactive sequence template. The instructions also can cause the processor to enable the operator to cancel a previously created interactive sequence instance for the interactive sequence template.

The instructions configured to cause the processor to create, automatically, interactive sequence instances can be configured to cause the processor to create automatically interactive sequence instances for the interactive sequence template when new or updated advertisement schedule information is received for spots for the associated linear advertisement in the new or updated advertisement schedule, the spots having a linear advertisement identifier that matches the linear advertisement identifier specified for the interactive sequence template. The instructions also can cause the processor to cancel automatically interactive sequence instances previously created for the interactive sequence template for spots for the associated linear advertisement in a present advertisement schedule that are not included as spots for the associated linear advertisement in the new or updated advertisement schedule.

An example of a communications system configured to synchronize interactive advertisements with linear advertisements includes: means for receiving advertisement schedule information about slots for linear advertisements on one or more channels of the communications system; means for receiving information about one or more cue messages, the one or more cue messages detected in real-time media, each cue message indicating a respective start time and a respective index of a respective slot for one or more respective linear advertisements; means for receiving information about one or more interactive sequences, each interactive sequence to be synchronized with a respective spot for an associated linear advertisement; means for generating an interactivity event for each respective interactive sequence; means for calculating a start time for each respective interactivity event using information about a respective associated cue message; and means for forwarding an activation message with the respective start time for each respective interactivity event.

Embodiments of such a system may include one or more of the following features. The system can include means for calculating an updated start time for each respective interactivity event using the respective start time in each respective activation message and a media delay through the communications system. The system also can include means for receiving a cue cancel message generated when insertion of a linear advertisement fails. The system can further include means for forwarding a cancelation message to cancel an interactivity event based on a received cue cancel message, an instruction to cancel an interactive sequence received from an operator, or automatic cancelation of an interactive sequence instance.

The advertisement schedule can include one or more windows for linear advertisements, one or more slots for linear advertisements in each window, and one or more spots for linear advertisements in each slot; the system also can include means for associating each cue message with a respective slot for linear advertisements in a respective window of the advertisement schedule based on the respective start time and the respective index indicated in the respective cue message; and the means for calculating the start time for each respective interactivity event can include means for calculating the start time for each respective interactivity event for each respective interactive sequence to be synchronized with a respective spot for an associated linear advertisement in the respective slot for linear advertisements in the respective window of the advertisement schedule, the respective slot associated with the respective cue message. The advertisement schedule can indicate that interactivity can be played on top of a spot for a linear advertisement by indicating a type of the spot as interactive. The means for calculating the start time for each respective interactivity event can include means for calculating the start time for each respective interactivity event for each respective interactive sequence to be synchronized with the respective spot for the associated linear advertisement using an offset, specified by an operator, from a respective start time of the respective spot for the associated linear advertisement.

The system can further include: means for enabling an operator to associate an interactive sequence with a respective linear advertisement; means for enabling the operator to create a scene template for the interactive sequence; means for enabling the operator to specify timing information for the interactive sequence; and means for forwarding information about the interactive sequence after the operator indicates that the interactive sequence is ready to distribute, wherein the means for generating the interactivity event for an interactive sequence further include means for generating the interactivity event for the interactive sequence using the scene template and the specified timing information. The means for enabling the operator to associate the interactive sequence with the respective linear advertisement can further include means for enabling the operator to associate the interactive sequence with the respective linear advertisement if a spot for the respective linear advertisement in the advertisement schedule has an interactive type. The system can include means for forwarding updated information about an updated interactive sequence. The scene template for the interactive sequence can include one or more of Click-to-SMS, Click-for-Info, Click-to-Web, and Click-to-Call templates. The system also can include means for enabling the operator to configure the interactive sequence for supporting interactivity with a single instance of the associated linear advertisement. The system can further include means for enabling the operator to cancel a previously created interactive sequence.

The system can include means for enabling the operator to configure an interactive sequence template for supporting interactivity for recurring instances of the associated linear advertisement by specifying a linear advertisement identifier for the interactive sequence template. The system also can include means for creating, automatically, interactive sequence instances for the interactive sequence template for spots for the associated linear advertisement in the advertisement schedule, the spots having a linear advertisement identifier that matches the linear advertisement identifier specified for the interactive sequence template. A network name can be specified for the interactive sequence template; and the system can further include means for determining the spots for creating automatically the interactive sequence instances as the spots having a linear advertisement identifier that matches the linear advertisement identifier specified for the interactive sequence template and a network name that matches the network name specified for the interactive sequence template. The system can further include means for enabling the operator to cancel a previously created interactive sequence instance for the interactive sequence template.

The means for creating automatically interactive sequence instances can include means for creating automatically interactive sequence instances for the interactive sequence template when new or updated advertisement schedule information is received for spots for the associated linear advertisement in the new or updated advertisement schedule, the spots having a linear advertisement identifier that matches the linear advertisement identifier specified for the interactive sequence template. The system also can include means for canceling automatically interactive sequence instances previously created for the interactive sequence template for spots for the associated linear advertisement in a present advertisement schedule that are not included as spots for the associated linear advertisement in the new or updated advertisement schedule.

Items and/or techniques described herein may provide one or more of the following capabilities. An interactivity feature can enable user engagement while the user is watching particular broadcast content (e.g., a TV program or a commercial) on his or her mobile device. Interactivity features enable active watching, as opposed to passive watching, by allowing users to actively interact and participate with content presented on their mobile devices. Interactive advertisements shown on top of linear advertisements can provide the opportunity for users to interact with media currently being played. It is important that an interactive advertisement be synchronized with a linear advertisement to provide the user experience desired by an advertiser. Accurate synchronization of the interactive advertisement with the appropriate point in the linear advertisement provides enhanced user experience, which can increase user retention for the broadcast service. Advertisers are unlikely to add interactive advertisements on top of linear advertisements if synchronization cannot be achieved. Thus, it is important to achieve this synchronization to enable a content delivery system to earn advertising revenue. In addition, accurate synchronization of interactive advertisements with linear advertisements increases the likelihood of user participation in the interactivity, which can generate additional revenue for carriers, e.g., revenue from short message service (SMS) based interactivity, and advertisers. While item/technique-effect pairs have been described, it may be possible for a noted effect to be achieved by means other than those noted, and a noted item/technique may not necessarily yield the noted effect.

In the figures, components with similar relevant characteristics and/or features may have the same reference label.

DETAILED DESCRIPTION

As used herein, an interactivity event ("ITV event") refers to an event that is delivered with broadcast media and that provides content and one or more functionality triggers for initiating an interactivity function on a mobile device. Interactivity content can be displayed to a user on a mobile device in a sequence of one or more scenes, which is referred to herein as an interactive sequence ("iSeq"). An interactive sequence can include a collection of scenes that are bundled into a coherent entity that is intended to be rendered and presented as a single experience to the viewer. Interactive sequence application data can include scene information, text, images, and user actions related metadata that can be used to generate an interactive sequence.

Techniques described herein provide mechanisms for synchronizing interactive advertisements with linear advertisements. Although the synchronization techniques are described in the context of the MediaFLO™ broadcast system, the techniques are also generally applicable to other broadcast systems. An interactivity production module can receive information about an advertisement schedule for linear advertisements from a traffic module. The interactivity production module is configured to allow an operator to create an interactive sequence and associate the interactive sequence with a linear advertisement of the advertisement schedule. The interactivity production module can also receive interactivity data to create an interactive sequence from an interactivity content provider. The interactivity production module receives a cue message including a start time for an advertisement slot for one or more linear advertisements. The interactivity production module matches the interactive sequence with a linear advertisement of the advertisement slot specified by the cue message and calculates a start time of an interactivity event for the interactive sequence. The interactivity production module forwards an activation message for the interactive sequence with the calculated start time of the associated interactivity event to an interactivity server. The interactivity server can update the interactivity event start time to account for an end-to-end media delay through the broadcast network, which can ensure that the interactive advertisement is played in synchronization with the associated linear advertisement. Other embodiments are within the scope of the disclosure and claims.

Mobile Broadcast System

Figure 1:
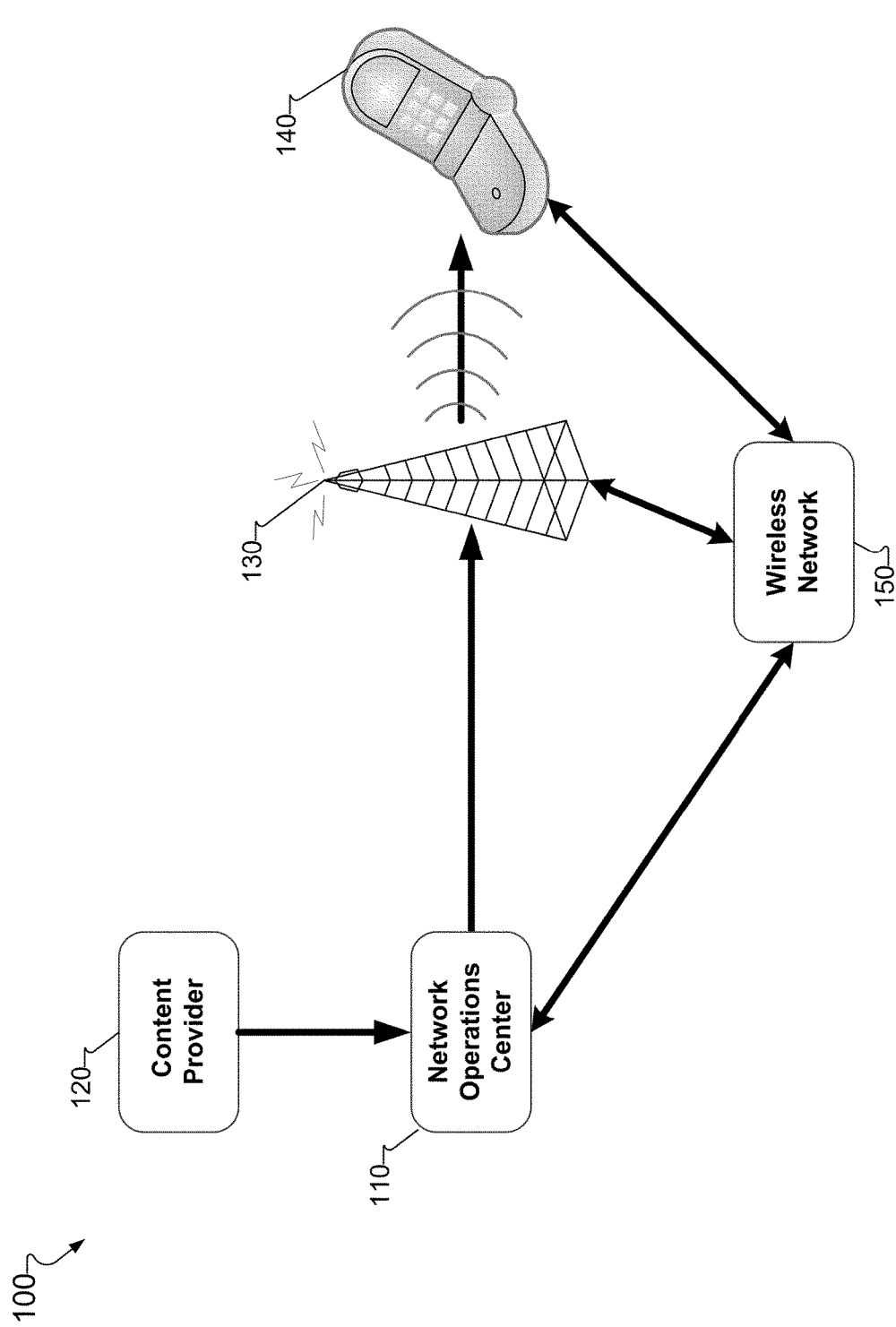
FIG. 1 illustrates an exemplary mobile broadcast system.

FIG. 1 illustrates an exemplary mobile broadcast system 100. The mobile broadcast system operates in accordance with the standards published by the FLO forum, and in particular is typified by the MediaFLO™ broadcast system by QUALCOMM Incorporated of San Diego, Calif. Using a cellular standard, such as GSM or CDMA, enables MediaFLO™ to provide security and services utilizing unicasting associated with a wireless paradigm. The MediaFLO™ mobile broadcast platform delivers content across a mobile environment. MediaFLO™ utilizes a combination of broadcast and wireless paradigms to provide business opportunities within a mobile broadcast ecosystem. Using the Forward Link Only (FLO) air interface standard, MediaFLO™ provides greater content capacity and reduced content delivery costs associated with broadcasting paradigms.

MediaFLO™, or FLO™, technology is designed to meet the mobile entertainment requirements of end users and service providers, by, for example, providing television services to end users and features designed to facilitate monetization by service providers. MediaFLO™ provides a broad range of content to mobile devices in a spectrally efficient, cost-effective and designed for low power consumption system. For example, the MediaFLO™ system can deliver streaming television, video and audio, Clipcast™ video and audio, and real-time Internet Protocol (IP) data services to MediaFLO™ compatible mobile devices. The mobile devices can selectively receive, display, play, store, and manipulate the content delivered over the mobile broadcast system 100. Devices usable with the MediaFLO™ system include smartphones, cellular phones, mobile television devices, personal digital assistants (PDA), interactive game devices, notebooks, smartbooks, netbooks, data processing apparatus, or other such electronic devices.

MediaFLO™ also can be configured to group programming into one or more subscription packages. Users, or subscribers, operating MediaFLO™ compatible mobile devices can select one or more of the MediaFLO™ subscription packages. For example, reception and decoding of channels included in a MediaFLO™ subscription package can be enabled in response to user input, e.g., touching a touchscreen on a MediaFLO™ compatible mobile device. Any number of conditional access solutions (CAS) can be utilized for controlling access to MediaFLO™ content and services. Additionally, the mobile broadcast system 100 can maintain quality by providing service flexibility with variable bit rate encoding. Variable bit rate encoding balances bandwidth, which is important to the service operator, with high-quality audio and video, which makes the end user experience more enjoyable.

MediaFLO™ end user services can include real-time content delivery, such as video and audio presentations, audio only programming and audio with slides programming. In some implementations, the real-time services can include enhanced H.264 video and AAC+ audio formats. End user services also can include non-real-time content delivery, such as network scheduled delivery of audio clips, e.g., MP4, and multimedia files, e.g., JPEG, PNG, and HTML. Non-real-time services generally comprise the mobile device capturing specific pieces of multimedia and other data for presentation at a later time. For example, a non-real-time service called "clipcasting" provides network scheduled delivery of data services and files, such as wallpaper or e-coupons, for capture by a mobile device. Additionally, Clipcast can be implemented to deliver multimedia clips with multi-presentation views, e.g., from a plurality of perspectives, to a mobile device in accordance with a network schedule.

The mobile broadcast system 100 also can enable audio and video clips, or multimedia clips, to be stored at the MediaFLO™ compatible mobile device in internal memory, external memory, or both. End users can view, listen, and play any stored clip that has not expired. In some implementations, the mobile device can include a file cache size that is configurable by the service operator, the end user, or both.

Additionally, MediaFLO™ can offer end user IP data services, such as FLO network delivery of Internet traffic to third-party applications. Third-party mobile applications can provide end users with dynamic home pages, that include, e.g., stock, news, weather and sports information. For example, the delivery of IP data services can enable stock tickers to be tailored to a user's specific profile. Additionally, MediaFLO™ can be integrated with two-way data exchange applications, such as text and voice chat, live voting, email and web browsing, video-on-demand and shopping, in addition to other interactive mobile application features. With such interactivity, a user can obtain additional information associated with the real-time or non-real-time programming. For example, a dinner recipe may be downloaded during the broadcast of a cooking show and shared with a user's friends, e.g., via a SMS message.

Referring once again to FIG. 1, the mobile broadcast system 100 generally comprises multiple nodes 110-140 that communicate, for example, over a wireless network 150. The wireless network 150, also referred to as a "wireless communication system," encompasses both the physical network as well as digital signal technology. The wireless network 150 can be implemented as: a code division multiple access (CDMA) system; a frequency division multiple access (FDMA) system; a time division multiple access (TDMA) system such as Global System for Mobile communications (GSM), GSM/General Packet Radio Service (GPRS), Enhanced Data GSM Environment (EDGE) or Terrestrial Trunked Radio (TETRA); a Wideband CDMA (WCDMA) system; Evolution Data Optimized (EV-DO) systems such as 1xEV-DO, EV-DO Rev A or EV-DO Rev B; High Speed Packet Access (HSPA) systems such as High Speed Downlink Packet Access (HSDPA), High Speed Uplink Packet Access (HSUPA) or Evolved High Speed Packet Access (HSPA+); a Long Term Evolution (LTE) system; or other communications systems, such as a system utilizing 3G or 4G technology. Content distributed over the interconnected nodes 110-140 can be selectively received, transmitted, processed, stored, and displayed.

The nodes of the mobile broadcast system 100 generally comprise a network operations center 110, one or more content providers 120, one or more FLO transmitters 130, and a plurality of mobile devices 140. The network operations center 110 can include one or more receivers (not shown) configured to receive content from one or more content providers 120. In some implementations, the receivers can reside at the network operations center 110. For example, the network operations center 110 can include a C-band receiver configured to receive content delivered by a C-band satellite content provider 120. In other implementations, the receivers can be located remotely from the network operations center 110 and can deliver the received content to the network operations center 110 using wired or wireless technology. The content received from the one or more content providers 120 can include local and national content. The local and national content can include real-time, non-real-time and IP data services content.

The real-time content can be received from C-band and Ku-band satellites, terrestrial broadcast transmitters, and data networks, in addition to other such transmitting devices and networks. The real-time content can include video, such as MPEG-2 over asynchronous serial interface, or YUV over serial digital interface. The real-time content also can include audio, such as AC-3 or MP2 over ASI, as well as PCM over SDI. Additionally, real-time content formatted in NTSC and PAL technologies can be delivered to the network operations center 110. Real-time MediaFLO™ content and services can be implemented to bring television experiences, similar to those experienced on a traditional television, to a mobile device. For example, the television experiences can include general entertainment programming, such as live sporting events, news, music concerts, and weather updates.

Similarly, non-real-time content formatted in MPV, such as MPEG-4 audio and video clips, and data services via Clipcast (DSvC), such as JPEG, PNG and HTML files, also can be received at the network operations center 110. The network operations center 110 can process the non-real-time content and can schedule network delivery of the content to one or more mobile devices. MediaFLO™'s non-real-time content and file delivery can extend the user experience to include short clips, e.g., YouTube™ videos, and files of non-real-time content, e.g., stored audio files.

In addition, MediaFLO™ can be implemented to deliver IP data services content, such as stock tickers, weather and news updates to the network operations center 110. The IP data services content can include a broad range of information accessible to each MediaFLO™ subscriber. In some implementations, the IP data services content can be tailored to a user's specific profile. For example, a MediaFLO™ subscriber can choose to receive particular IP data services content, such as weather and sports scores, at their Media-FLO™ compatible mobile device. Both the non-real-time and IP data services content can be delivered to the network operations center 110 over one or more data networks.

In some implementations, the network operations center 110 can aggregate the content received from the one or more content providers 120. In some implementations, the network operations center 110 can include additional content, such as locally stored content in the multiplexed content data stream. The aggregated content can be multiplexed at the network operations center 110 and distributed as a content data stream to one or more FLO transmitters 130. The one or more FLO transmitters 130 can receive the multiplexed content data stream from the network operations center 110. Based on the multiplexed content data stream, the FLO transmitters 130 can generate one or more FLO waveforms. The one or more FLO waveforms can be transmitted to one or more mobile devices 140.

Figure 2:
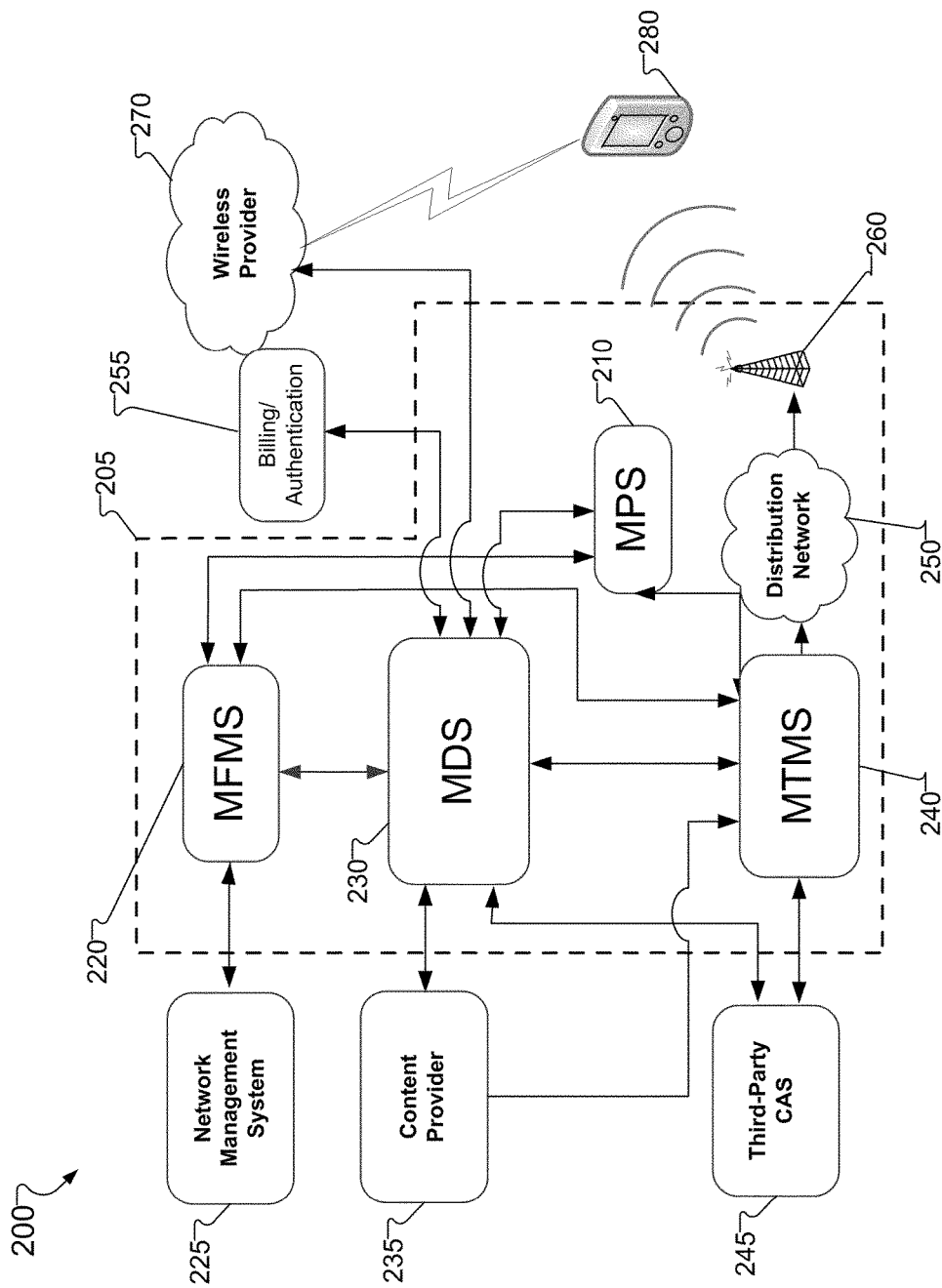
FIG. 2 illustrates an exemplary MediaFLO™ system logical architecture.

Text, graphical and video content received from the FLO transmitters 130 can be displayed on a display screen at the mobile device 140. Audio content received from the FLO transmitters 130 can be played back at one or more audio outputs at the mobile device 140. The mobile device 140 can include an external and internal memory module that can store the received content. In some implementations, the mobile device 140 can communicate with the network operations center 110 over a reverse link, such as the wireless network 150. The reverse links can be used to communicate information for mobile device 140 activations, service key distribution, subscriptions, and usage tracking MediaFLO™ System Logical Architecture FIG. 2 illustrates an exemplary MediaFLO™ system logical architecture 200. The MediaFLO™ system logical architecture 200 includes one or more systems, subsystems, and components, a subset of which constitute a MediaFLO™ network 205. The MediaFLO™ network 205 generally comprises a MediaFLO™ Provisioning System (MPS) 210, a MediaFLO™ Management System (MFMS) 220, a MediaFLO™ Distribution System (MDS) 230, and a MediaFLO™ Transcode and Multiplex System (MTMS) 240. The MediaFLO™ network 205 may be implemented in the network operations center 110 depicted in FIG. 1. The MediaFLO™ network 205 also includes a FLO Radio Access Network (RAN) subsystem, comprising the MTMS 240, a distribution network 250 and one or more FLO transmitters 260. The MediaFLO™ network 205 can be implemented to deliver real-time, non-real-time and IP data services content to one or more mobile devices, such as a MediaFLO™ device 280.

The MPS 210 provides one or more interfaces for an operator to configure the MediaFLO™ network 205. The MPS 210 distributes the MediaFLO™ network 205 configuration to the various systems, subsystems, and components included in the MediaFLO™ network 205. In some implementations, the MPS 210 can provide one or more web services programming interfaces. Web and software developers can generate custom web services applications through the web service programming interface. For example, a MediaFLO™ developer using the MPS 210 programming interface can generate and offer custom subscription packages to MediaFLO™ subscribers. In addition, the MPS 210 can share data and information, i.e., transmit to and receive from, with the MFMS 220, the MDS 230, and MTMS 240.

The MFMS 220 performs the operations, administration and maintenance functions for the MediaFLO™ network 205. Specifically, the MFMS 220 can monitor the systems constituting the MediaFLO™ service platform, i.e., the MPS 210, the MDS 230, and the MTMS 240. Components outside the MediaFLO™ service platform can be monitored by other systems, subsystems, or components. The MFMS 220 can provide management interfaces to enable network, state, fault, security, performance, and log management within the MediaFLO™ network 205. Network management can include discovering new networks and nodes to monitor, deleting monitored nodes, controlling MediaFLO™ agents and components, such as reset counters, restarting components, and terminating components. For example, the MFMS 220 network management interface can be used to communicate with and control the network management system 225. The network management system 225 can be implemented to manage the MediaFLO™ network 205 within, or external to, the MediaFLO™ network 205.

State management can include monitoring the high availability state of MediaFLO™ components, managing the administrative state of MediaFLO™ components, and monitoring the operational state of MediaFLO™ components. Fault management can include managing events, alarms and alarm maps, as well as performing fault recovery. For example, a network operator can clear one or more alarms using a client interface associated with the fault management server component of the MFMS 220. Security management can include controlling operator access to the element management system and fault management system. Performance and log management can include collecting statistics from MediaFLO™ components, providing threshold-based monitoring, and providing reports and graphical views for the Key Performance Indicators (KPI) generated from the statistics. KPIs can be derived from the statistics and can define and measure progress toward organizational goals. In addition, the MFMS 220 can share data and information with the MDS 230 and the MTMS 240.

The MDS 230 provides efficient distribution of encrypted content across one or more wireless networks. The wireless networks can include data optimized (DO) networks, DO-multicast networks, 3G or 4G networks and FLO networks. The MDS 230 can maintain responsibility for aggregation and distribution of real-time content, non-real-time content, IP data services content, subscription services management and FLO resource scheduling. Additionally, the MDS 230 can be implemented to perform configuration management for the MediaFLO™ network 205. The MDS 230 also can include one or more of the following subsystems: distribution; digital rights management (DRM); subscription, billing and service management; unicast request handling; and usage tracking The MDS 230 distribution subsystem interfaces with one or more content providers 235 to receive real-time, non-real-time, and IP data services content from the one or more content providers 235. The MDS 230 functions to provide a single user interface for streaming, Clipcast, and IP data services content. In some implementations, the MDS 230 distribution subsystem manages files, clips, and data content delivery. The distribution subsystem may also receive and consolidate program guide data from the content provider 235 and other sources, e.g., Tribune Media Services. The consolidated guide is termed a MediaFLO™ Program Guide (MPG) and can be implemented as an easy to use guide that contains program description and file delivery information associated with MediaFLO™ end users. The MDS 230 distributes the content, the MPG, and subscription information to one or more mobile devices using a FLO transmitter 260 or via a wireless provider 270.

The MDS 230 also can generate system information, such as overhead information, and can initiate distribution of the overhead information. In addition, the distribution subsystem can receive Clipcast content from content providers and can schedule clip delivery to mobile devices, such as a MediaFLO™ device 280, during contact windows. The distribution subsystem also can encrypt content for conditional access and apply forward-error-correction (FEC) encoding to improve reception probability at the MediaFLO™ device 280. Additionally, the distribution subsystem can be implemented to deliver content based on a network, or content provider, delivery schedule.

The MDS 230 DRM subsystem can distribute encryption keys to MediaFLO™ network 205 components. In addition, the DRM subsystem can securely distribute decryption keys to one or more MediaFLO™ devices 280. The DRM subsystem also can synchronize with one or more the third-party CAS 245. Third-party CAS 245 can provide protection of services on a per-user basis. For example, a third-party CAS 245 can blackout specific programs in certain regions, or restrict content available to a particular market.

The MDS 230 subscription, billing and service management (SBSM) subsystem can be implemented to make subscription-based billing predictable and readily understood. The SBSM subsystem can manage and provide MediaFLO™ content package subscriptions. For example, the SBSM subsystem can provide subscription services and a back-end billing interface 255 for the MediaFLO™ network 205. The back-end billing interface 255 can include billing and authentication information, in addition to authorization and accounting functions. Additionally, the SBSM subsystem can provide MediaFLO™ service management and can generate new and custom subscription packages. The SBSM subsystem can receive subscription information from one or more mobile devices. In some implementations, the SBSM subsystem can activate MediaFLO™ services for one or more subscribing mobile devices.

The MDS 230 unicast request handling subsystem can be implemented to manage functions related to unicast device-to-server interface protocols. The unicast request handling subsystem includes a unicast configuration server (UCS) and a usage tracking service request handler (UTSRH). The UCS can receive provisioned application upgrade information sent from the MPS 210. In some implementations, the MPS 210 maintains all application version information, whereas the UCS only maintains the latest application version information. The MediaFLO™ device 280 generally receives application upgrade notifications via, e.g., a multicast notification delivery path from the wireless provider 270. However, when the MediaFLO™ device 280 application version is out-of-date, the MediaFLO™ device 280 can perform an application upgrade check via a unicast connection to the UCS to obtain the latest version information. The UTSRH can collect service usage and performance statistics from MediaFLO™-enabled mobile devices. For example, the MediaFLO™ device 280 can be instructed to log usage events and upload the logged usage tracking statistics to the UTSRH. The UTSRH can collect the usage tracking statistics from the MediaFLO™ device 280 and can forward the usage tracking log to the usage tracking subsystem. In some implementations, usage tracking parameters can be transmitted to the MediaFLO™ device 280 as part of the notification flow. The MediaFLO™ device 280 can decide what events to log and when to log the usage tracking statistics based on the usage tracking parameters.

The MDS 230 usage tracking subsystem can receive the MediaFLO™ device's 280 upload data from the UTSRH and can log the data in persistent storage. In some implementations, the usage tracking subsystem can collect upload data directly from the one or more MediaFLO™-enabled mobile devices. The usage tracking subsystem can be implemented to share at least a portion of the usage tracking statistics with one or more third-party entities. In some implementations, the third-party entities can use the usage tracking statistics to measure MediaFLO™ users' service usage patterns. In addition, the MDS 230 can share data and information with the MTMS 240.

The MTMS 240 can be implemented to receive content from one or more content providers 235. The content can include real-time, non-real-time and IP data services content. The MTMS 240 can aggregate the received content and can change the content into a format supported by one or more mobile devices. In some implementations, the MTMS 240 can encode the content received from the one or more content providers 235. For example, real-time, non-real-time and IP data services content can be aggregated and transcoded at the MTMS 240 for delivery to the MediaFLO™ device 280. The MTMS 240 also can multiplex the received content before delivering encoded and multiplexed content to a distribution network 250. In some implementations, a multiplexer component of the MTMS 240 can aggregate the received content and alter the content into a MediaFLO™ supported format. Additionally, in some implementations, the multiplexer component can include a statistical multiplexer (Stat-MUX) that can be configured to change the bit rate of services according to the needs of different channels at different times. In statistical multiplexing, a communication channel can be divided into an arbitrary number of variable bit rate digital channels or data streams. The Stat-MUX can employ a more complex method of managing change in input channel bit rates, which can result in a better utilization of bandwidth. For example, using the Stat-MUX, a MediaFLO™ network 205 operator can decrease the bit rate for generally static channel programming, like a newscast, while increasing the bit rate for more dynamic channel programming, like a basketball game. The MTMS 240 also can be implemented to encrypt content, in addition to determining resource allocation and distribution of content. Moreover, the MTMS 240 can communicate with one or more third-party CAS 245. In addition, the MTMS 240 can transmit data and information through the distribution network 250 to the FLO transmitter 260.

The distribution network 250 can receive encoded content from the MTMS 240 and can distribute the content to the one or more FLO transmitters 260. The FLO transmitter 260 can receive encoded content from the MTMS 240 over the distribution network 250. The encoded content can include content belonging to a wide-area operational infrastructure (WOI) and a local-area operational infrastructure (LOI). Generally, the WOI content is associated with a wide-area broadcast signal that will be transmitted over a larger broadcast area than the LOI content, which is associated with a local-area broadcast signal. For example, the WOI content may be national news, and the LOI content may be regional or local news. The WOI and LOI content can be received by the FLO transmitter 260 in distinct WOI and LOI signals, or in one or more combined signals. The FLO transmitter 260 can be implemented to transmit the WOI content, the LOI content, or both, as a mobile broadcast signal to one or more mobile devices. The FLO transmitter 260 can supply the content to MediaFLO™-enabled mobile devices by transmitting a FLO waveform. For example, the FLO transmitter 260 can transmit a FLO waveform including the WOI and LOI content to the MediaFLO™ device 280.

In some implementations, the FLO transmitter 260 also can transmit content particular to a specific venue, or micro-venue. The content particular to the specific venue or micro-venue can be received from the MTMS 240 over the distribution network 250. Venues can include, e.g., sporting arenas, concert halls, movie theatres, shopping malls, or other such event locations. For example, the FLO transmitter 260 can transmit player statistics associated with a baseball game to MediaFLO™-enabled mobile devices residing within the confines, or surrounding area, of a baseball stadium. Micro-venues can include, e.g., office buildings, automobiles or other mobile objects, restaurants, shopping mall department stores or kiosks, or other more localized event locations. For example, the FLO transmitter 260 can transmit sale-related data to users operating MediaFLO™-enabled mobile devices within the confines, or surrounding area, of a department store. Additional information related to venue and micro-venue broadcasting can be found in U.S. patent application Ser. No. 12/569,792, filed Sep. 29, 2009, entitled "Apparatus and Methods of Providing and Receiving Venue Level Transmissions and Services," the entire contents of which are incorporated by reference herein.

The FLO transmitter 260 can include an exciter component and a transmitter component. The exciter component can receive ASI MPEG-2 transport streams and can perform proportional-integral-derivative (PID) filtering for the desired multiplex. The exciter component also can generate low power, e.g., less than 1-watt, FLO waveforms for the transmitter input. The transmitter component can generate RF signals that can be received over an air interface by one or more mobile devices. In some implementations, the transmitter can generate and transmit a FLO waveform using orthogonal frequency division multiplexing (OFDM). The transmitter also can be implemented to deliver RF signals to the MediaFLO™ device 280 via broadcast, multicast and unicast methodologies.

In some implementations, the MTMS 240, the distribution network 250 and the FLO transmitter 260 comprise the FLO RAN subsystem. The FLO RAN subsystem can receive real-time, non-real-time and IP data services content, and can perform audio and video encoding. The FLO RAN subsystem also can multiplex the received content and can distribute the multiplexed data streams. For example, the FLO RAN subsystem can receive real-time content, encode it, and multiplex it with other services, e.g., IP data services or DSvC, before encapsulating and distributing the content to FLO transmitters 260. Additionally, the FLO RAN subsystem can transmit one or more FLO waveforms to one or more mobile devices. For example, the FLO transmitter 260 of the FLO RAN subsystem can transmit one or more FLO signals to the MediaFLO™ device 280. The MediaFLO™ device 280 can be implemented to demodulate the FLO RF signal. Users operating the MediaFLO™ device 280 can navigate through each of the MediaFLO™ supported services and can access content received at the device. In addition, MediaFLO™ device 280 users can perform transaction-oriented operations with the MDS 230 over unicast connections through the wireless provider 270.

Interactivity System Architecture

An interactive advertisement provides the opportunity for users to interact with the media currently being played by mobile receivers acquiring content from a mobile broadcast network. Interactive advertisements can be played on top of (e.g., overlaid over) a linear advertisement or an audio/video program. It is important that an interactive advertisement be accurately synchronized with the linear advertisement (e.g., synchronized with a particular point in the linear advertisement) to provide expected user experience as desired by the advertiser. Accurate synchronization can increase user participation in the interactivity and can result in higher user retention and additional advertising related revenue for carriers, broadcast network operators, and advertisers.

The techniques disclosed below illustrate mechanisms to synchronize an interactive advertisement (herein referred to as an "iAd") with linear advertisements (e.g., audio or video advertisements) delivered by the mobile broadcast network to one or more mobile devices (e.g., the mobile device 140 of FIG. 1). A linear advertisement is broadcast at appropriate times (e.g., during advertisement breaks) as part of the video and/or audio content media stream on the mobile broadcast network. An iAd is synchronized to play on top of an associated linear advertisement. The linear advertisement is inserted in the linear video and/or audio content media stream either at a network operations center (e.g., the network operations center 110 of FIG. 1) or at a content provider (e.g., the content provider 120 of FIG. 1).

Figure 3:
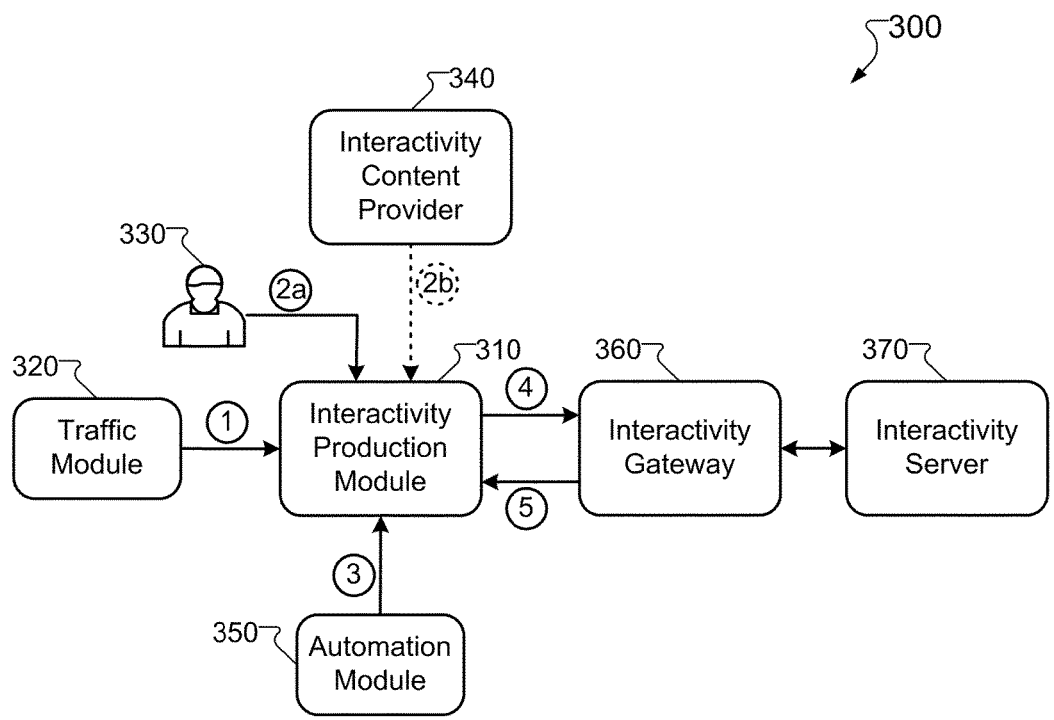
FIG. 3 illustrates an exemplary architecture for an interactivity system configured to provide support for adding interactivity to linear advertisements.

FIG. 3 illustrates an exemplary architecture for an interactivity system 300 configured to provide support for adding interactivity to linear advertisements. In some implementations, the functions provided by the components of the interactivity system 300 are implemented in fewer components or more components (not shown) than the components illustrated in FIG. 3.

The interactivity system 300 can include an interactivity production module 310, a traffic module 320, one or more operators 330, an interactivity content provider 340, an automation module 350, an interactivity gateway 360, and an interactivity server 370.

The traffic module 320 generates advertisement schedule ("Ad Schedule") information for advertisement slots on real-time channels of the mobile broadcast network. The traffic module 320 makes the advertisement schedule information retrievable by the interactivity production module 310 on an interface, as shown in Step 1 of FIG. 3. Advertisement schedule information retrieved by the interactivity production module 310 provides a coarse advertisement schedule, which specifies a schedule window when slots for linear advertisements are scheduled to occur. As described further below, an advertisement schedule can include one or more advertisement spots per advertisement slot. The interactivity production module 310 enables an operator 330 to associate an interactivity sequence ("iSeq") with a linear advertisement by linking the iSeq to an advertisement spot of an advertisement slot specified in an advertisement schedule.

One or more operators 330 interact with the interactivity production module 310 through an operator interface to create an interactive sequence, as shown in Step 2a of FIG. 3. An interactivity content provider 340 also can send interactivity data to the interactivity production module 310 via an interface to create the iSeq, as shown in optional Step 2b of FIG. 3. The iSeq refers to interactive content displayed to viewers as a sequence of one or more scenes. An iSeq includes a collection of scenes bundled into a coherent entity that is intended to be rendered and presented as a single experience to the viewer. The operator 330 configures the iSeq, which includes specifying a list of parameters for the iSeq and linking the iSeq to an advertisement spot to associate the iSeq with a linear advertisement. Once the operator 330 completes configuration of the iSeq, the operator 330 enables the distribution of the iSeq information to the interactivity gateway 360 through the interactivity production module 310. The iSeq information can be distributed as iSeq signaling data and iSeq application data. The iSeq signaling data can provide interactivity Ad Schedule window timing, associated interactivity resource references, and other associated metadata. The iSeq application data describes scene information for the interactive sequence. The interactivity production module 310 can send the iSeq information to the interactivity gateway 360 over an interface with a push message, as shown in Step 4 of FIG. 3. The interactivity server 370 uses the iSeq signaling data received via the interactivity gateway 360 to deliver interactivity resources associated with the iSeq over the broadcast network using the interactivity Ad Schedule window timing. The interactivity resources associated with the iSeq are scheduled to be delivered to and acquired by receiving mobile devices before the start of the associated Ad Schedule window, which is the coarse time window range for the linear advertisement spot. The interactivity gateway 360 can retrieve iSeq information from the interactivity production module 310 over the interface with a pull message, e.g., at system startup time or during failover conditions, as shown in Step 5 of FIG. 3.

The operator 330 can update an iSeq after the iSeq has been created and distributed to the interactivity gateway 360. The interactivity production module 310 can send such updates to the interactivity server 370 via the interactivity gateway 360. The operator 330 can also cancel a previously created iSeq.

The interactivity production module 310 provides tools to the one or more operators 330 to add interactivity to linear advertisements. The interactivity production module 310 enables an operator 330 to create scene templates for iSeqs for various interactivity use cases. For example, the interactivity production module 310 enables the operator 330 to create a Click-to-Action scene template for an iSeq. The interactivity production module 310 also enables an operator 330 to specify timing information for an iSeq. The interactivity production module 310 generates an interactivity event for each iSeq added to a linear advertisement. An interactivity event ("ITV event") is an event that is delivered synchronously with the broadcast media and that provides a trigger to a receiving mobile device to start interactivity.

The automation module 350 supports play out functions for real-time media and advertisements. The automation module 350 detects cue messages received as part of the real-time media indicating the start of advertisement slots on the real-time channel. The automation module 350 forwards information related to the cue messages to the interactivity production module 310 on an interface, as shown in Step 3 of FIG. 3. In some implementations, an adaptor component is implemented between the automation module 350 and the interactivity production module 310 to adapt a cue message received in-band in the real-time media to the cue message format expected by the interactivity production module 310. The cue messages include a start time for an advertisement slot of the advertisement schedule. In some instances, the play out of a linear advertisement may fail on the automation module 350. When this occurs, the automation module 350 can send a cue cancel message to the interactivity production module 310 indicating that a given advertisement spot in the advertisement slot was canceled.

The interactivity production module 310 receives information about cue messages from the automation module 350. The information within a cue message indicates a start time for a particular advertisement slot of the advertisement schedule retrieved from the traffic module 320. For each iSeq associated with a linear advertisement spot of the particular advertisement slot, the interactivity production module 310 calculates a start time for the associated ITV event using the information about the respective cue message, as described in further detail below.

The interactivity production module 310 forwards an ITV event activation message for each ITV event to the interactivity server 370 via the interactivity gateway 360. The ITV event activation message includes the calculated start time for the associated ITV event. The interactivity server 370 can update the iSeq start time to account for end-to-end media delay through the broadcast network to ensure that the iAd is played in synchronization with the intended linear advertisement content. The interactivity server 370 broadcasts an ITV event signaling message close to the start time of the ITV event to receiving mobile devices for displaying the iAd.

The interactivity production module 310 also can cancel an ITV event, for example, based on either a cue cancel message received from the automation module 350 or an instruction to cancel received from the operator 330. To cancel the ITV event, the interactivity production module 310 forwards a cancelation message to the interactivity server 370 via the interactivity gateway 360. Further details of a process for synchronizing iAds with linear advertisements using the interactivity system 300 is provided below with respect to FIGS. 4-7.

In some implementations, there are two types of iSeqs which can be created to add interactivity on top of real-time content in the mobile broadcast network. A program iSeq can be created by an operator 330 to provide interactivity for an audio/video program. For this type of iSeq, the ITV event start time is specified by the operator 330 using the interactivity production module 310. The interactivity server 370 updates the iSeq start time entered by the operator 330 to account for end-to-end media delay, as stated above. The ITV event signaling message is broadcast with the updated event start time. This type of iSeq does not rely on advertisement timing information provided by the traffic module 320 and the automation module 350 and will not be discussed in further detail.

The other type of iSeq is an advertisement iSeq, referred to generally herein as an "iSeq." The iSeq provides interactivity for an audio/video linear advertisement having an advertisement spot in an advertisement schedule generated by the traffic module 320. In some implementations, two types of advertisement iSeqs are supported: a standalone iSeq and a recurring iSeq.

The standalone iSeq can be created by an operator 330 and manually associated with a linear advertisement having an advertisement spot in an advertisement schedule received from the traffic module 320. The standalone iSeq is configured for interactivity with a single instance of the associated linear advertisement. After the iSeq is linked with a linear advertisement having the respective advertisement spot, the interactivity production module 310 can automatically populate parameters in the parameter list for the iSeq based on the advertisement schedule information provided by the traffic module 320.

The recurring iSeq is created by an operator 330 for a linear advertisement, as identified by a unique Ad ID, that repeats in a given advertisement schedule, e.g., a car advertisement that repeats ten times during the day. For such a repeated linear advertisement, the interactivity production module 310 can provide support for automatically creating recurring iSeq instances for each recurring instance of the linear advertisement once the operator 330 has provided information for a recurring iSeq template, including the Ad ID for the linear advertisement. In some implementations, the interactivity production module 310 provides support for creating recurring iSeqs for a given linear advertisement on all of the mobile broadcast network services or only for a specific mobile broadcast network service (e.g., a particular network). Thus, the network service can be provided as an additional parameter when creating a recurring iSeq.

To support creating a recurring iSeq for a linear advertisement, an iSeq template is created to hold information for the iSeq for the recurring linear advertisement. The operator 330 creates the iSeq template using the interactivity production module 310. The operator 330 specifies an advertisement identifier (herein referred to as an "Ad ID") and optionally the service name (e.g., a particular network name) for which the iSeq template instances should be created. The interactivity production module 310 can then automatically create the recurring iSeq template instances based on the advertisement schedule information provided by the traffic module 320. Whenever a traffic module advertisement schedule is received at the interactivity production module 310, the interactivity production module 310 will create iSeq instances for interactive advertisement spots with an Ad ID that matches the Ad ID specified in the previously created iSeq template. If a service name is also specified for the iSeq template, the iSeq instances will be created for interactive advertisement spots with the matching Ad ID only on that service. If a service name is not specified in the iSeq template, the iSeq instances will be created for interactive advertisement spots with the matching Ad ID on all networks services. Similarly, when a new iSeq template is created, the interactivity production module 310 will automatically create iSeq instances for interactive advertisement spots in the current traffic module advertisement schedule with the matching Ad ID and/or the matching service name specified in the iSeq template.

Process for Synchronizing Interactive Advertisements with Linear Advertisements

Figure 4:
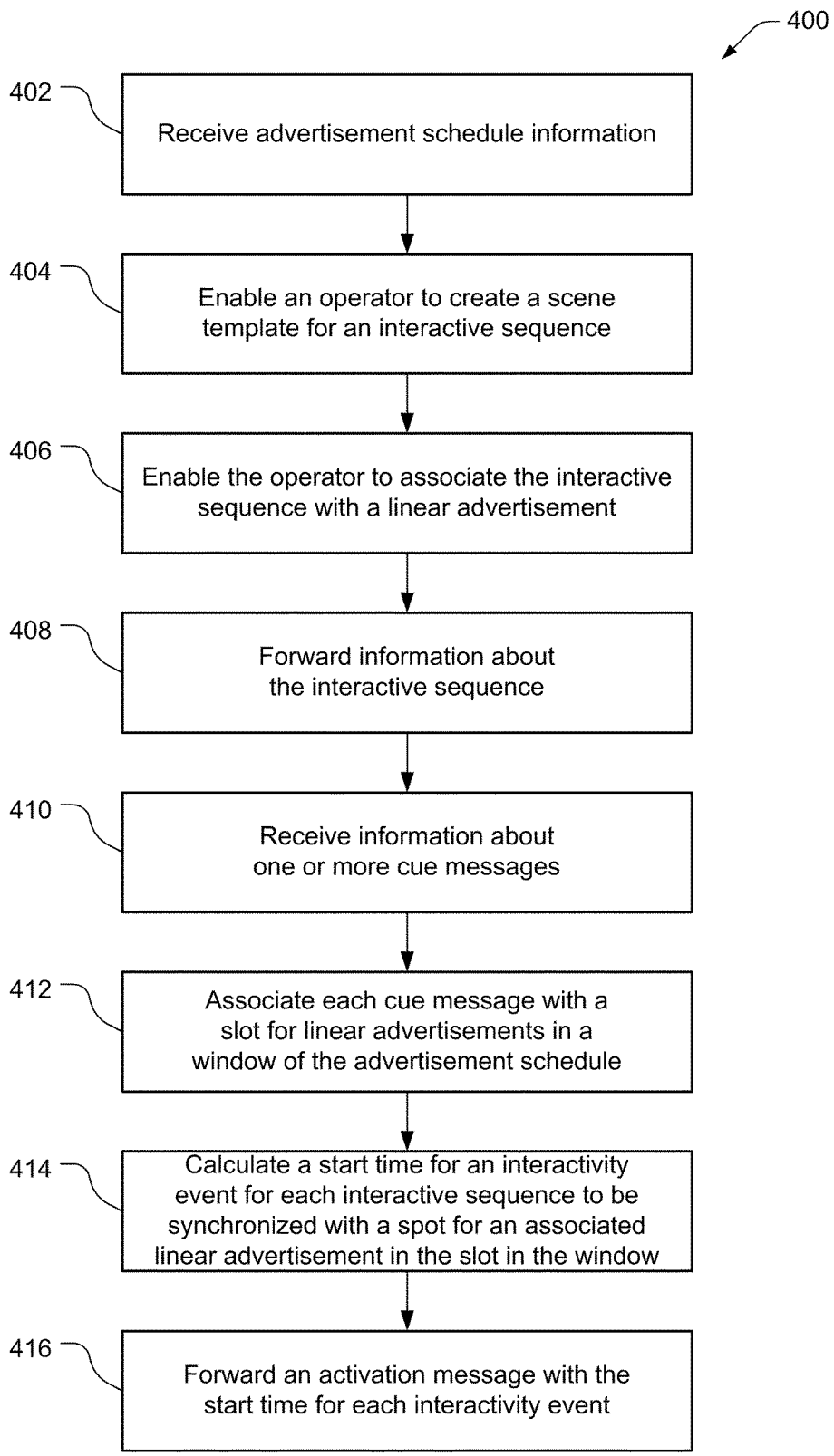
FIG. 4 is a block flow diagram of a process for synchronizing interactive advertisements with linear advertisements using the interactivity system shown in FIG. 3.
Figure 5:
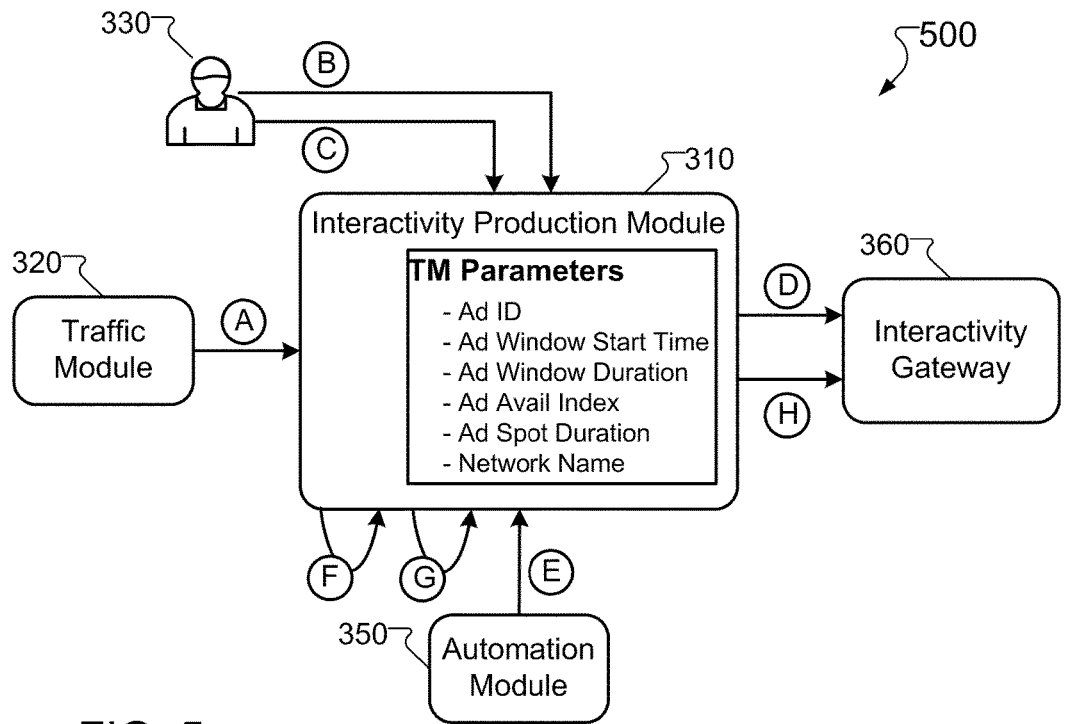
FIG. 5 illustrates an exemplary work flow for creating and activating an interactive sequence for an interactive advertisement for synchronization with a linear advertisement.
Figure 6:
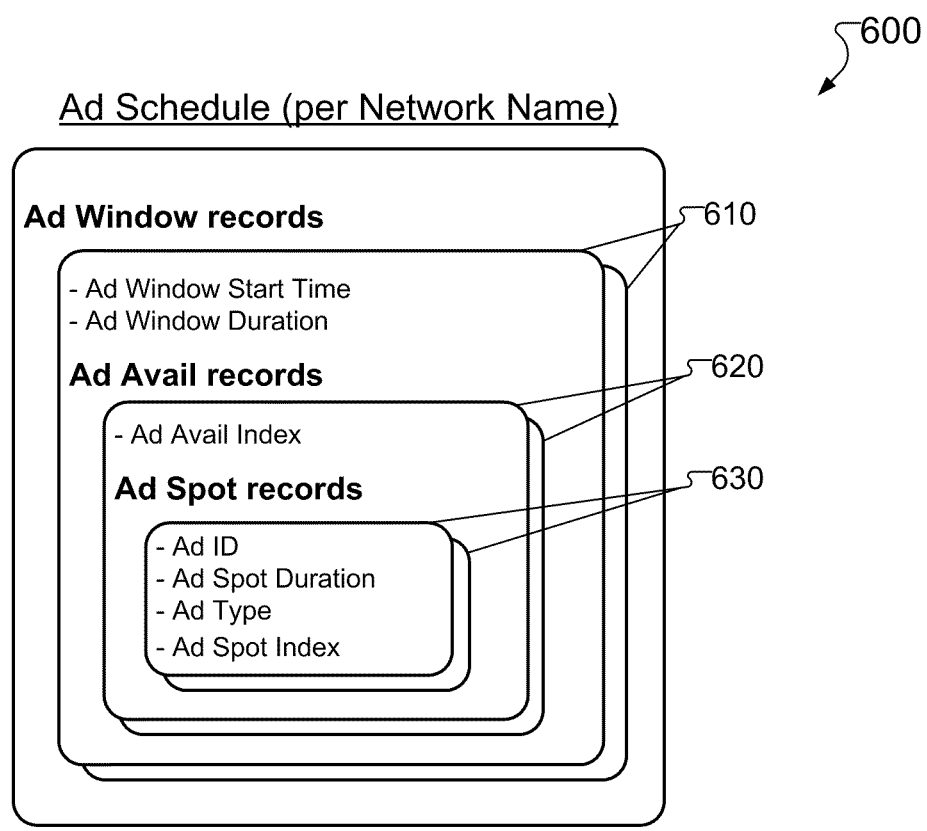
FIG. 6 illustrates an exemplary advertisement schedule including information about slots for linear advertisements.

Referring to FIG. 4, with further reference to FIGS. 5-6, a process 400 for synchronizing interactive advertisements with linear advertisements using the interactivity system 300 shown in FIG. 3 includes the stages shown. The process 400 is exemplary only and not limiting. The process 400 can be altered, e.g., by having stages added, removed, or rearranged. FIG. 5 illustrates an exemplary work flow 500 for creating and activating an iSeq for an interactive advertisement for synchronization with a linear advertisement. FIG. 6 illustrates an exemplary advertisement schedule 600 including information about slots for linear advertisements. FIGS. 4-6 refer to standalone iSeq(s), although the described techniques also generally apply to recurring iSeqs.

At stage 402, the interactivity production module 310 receives advertisement schedule information from the traffic module 320, as shown in Step A of FIG. 5. For example, the advertisement schedule can be generated by the traffic module 320 and retrieved by the interactivity production module 310. FIG. 6 shows logical information, which can be included in the advertisement schedule 600. Additional information (not shown) may also be included in the advertisement schedule 600.

The advertisement schedule 600 can be specified per mobile broadcast network service, as indicated by a network name. A separate advertisement schedule 600 can be received for each mobile broadcast network service. In some implementations, an advertisement schedule 600 is generated by the traffic module 320 on a daily basis. The advertisement schedule 600 includes a list of one or more Ad Window records 610, which each provide a coarse time range when linear advertisements can occur in the respective Ad Window. The coarse time range is specified by an Ad Window Start Time and an Ad Window Duration (e.g., 30 minutes).

Each Ad Window 610 includes one or more Ad Avail records 620. An Ad Avail record 620 corresponds to an advertisement slot (e.g., an advertisement slot of a couple minutes in length) during the real-time media stream when one or more linear advertisements are played in succession. For each Ad Avail record 620, an Ad Avail Index specifies the chronological position of that Ad Avail record 620 inside the Ad Window record 610. Each Ad Avail record 620 includes one or more Ad Spot records 630. Each Ad Spot record 630 specifies information for one linear advertisement and includes an Ad ID, an Ad Spot Duration indicating the length of the linear advertisement, an Ad Type indicating whether the linear advertisement is enabled for interactivity, and an Ad Spot Index indicating the play order for the linear advertisement in the Ad Avail record 620.

After receiving information about the advertisement schedule 600 from the traffic module 320, the interactivity production module 310 makes the information available to one or more operators 330 for associating with iSeqs created for interactive advertisements.

At stage 404, the interactivity production module 310 enables an operator 330 to create scene templates and, optionally, input metadata for an iSeq for a linear advertisement, as shown in Step B of FIG. 5. The scene templates for an iSeq can include one or more of Click-to-SMS, Click-for-Info, Click-to-Web, and Click-to-Call templates. The scene templates can also be created for other types of interactivity. The operator 330 can create the iSeq before or after the advertisement schedule 600 is received (e.g., retrieved) from the traffic module 320. In some implementations, an interactivity content provider (e.g., the interactivity content provider 340 of FIG. 3) sends interactivity data to the interactivity production module 310 to create the iSeq.

At stage 406, the interactivity production module 310 enables the operator 330 to associate the iSeq created for the linear advertisement with an interactive Ad Spot (i.e., an Ad Spot record 630 specifying the Ad ID of the linear advertisement and the Ad Type indicating that the linear advertisement is enabled for interactivity) of the advertisement schedule 600, as shown in Step C of FIG. 5. The interactivity production module 310 allows linking an iSeq to Ad Spots, which are identified as interactive by the Ad Type. The interactivity production module 310 can automatically populate the list of parameters for the iSeq using information about the advertisement schedule 600 (i.e., the Ad ID, the Ad Window Start Time, the Ad Window Duration, the Ad Avail Index, the Ad Spot Duration, and the Network Name) relating to the associated Ad Spot. In some implementations, the operator 330 can provide the Ad ID first and then select an Ad Spot from a list of Ad Spots associated with that Ad ID.

At stage 408, the interactivity production module 310 forwards information about the iSeq to an interactivity server (e.g., the interactivity server 370 of FIG. 3), e.g., via the interactivity gateway 360, as shown in Step D of FIG. 5. The interactivity production module 310 forwards the information in a push message after the operator 330 indicates that the iSeq is ready for distribution.

At stage 410, the interactivity production module 310 receives information about one or more cue messages from the automation module 350, as shown in Step E of FIG. 5. Each cue message indicates the start time and the index for an Ad Avail (i.e., an advertisement slot) within an Ad Window of an advertisement schedule 600 on a given mobile broadcast network service, as indicated by the network name.

For example, the automation module 350 can send a cue message indicating the start time for an advertisement slot which is determined based on cue tone detection in the real-time content. Typically, the cue message is sent a few seconds in advance of the actual Ad Avail start time. An example cue message from the automation module 350 includes the parameters listed in Table 1.

TABLE 1

Automation Module Cue Message Parameters

| Attribute | Mandatory | Description |
| --- | --- | --- |
| Network Name | Yes | Unique identifier for the mobile broadcast network service |
| Ad Avail Start Time | Yes | Start time in UNIX time format for the Ad Avail |
| Ad Avail Index | Yes | Index of the Ad Avail record in the Ad Window record |

Due to system delay, the cue message may be received at the interactivity production module 310 a few seconds after the Ad Avail Start Time in the cue message. The interactivity production module 310 can support processing such delayed cue messages.

At stage 412, the interactivity production module 310 associates each cue message with an Ad Avail record 620 (i.e., an advertisement slot) in an Ad Window record 610 of the advertisement schedule 600 of the mobile broadcast network service, as indicated by the network name, as shown in Step F of FIG. 5. The associated (i.e., the matching) Ad Window record 610 is the one which specifies the Ad Window Start Time and the Ad Window Duration that can include the Ad Avail Start Time indicated in the cue message. The associated (i.e., the matching) Ad Avail record 620 within the matching Ad Window record 610 is the Ad Avail specified by the Ad Avail Index indicated in the cue message.

At stage 414, the interactivity production module 310 calculates a start time for an ITV event for each iSeq to be synchronized with a spot for an associated linear advertisement in the Ad Avail (i.e., the advertisement slot) in the Ad Window, as shown in Step G of FIG. 5. The interactivity production module 310 determines if there are any iSeqs created for linear advertisements associated with an interactive Ad Spot in the associated (i.e., matching) Ad Avail record 620 in the associated (i.e., matching) Ad Window record 610. If there are such associated iSeqs, the interactivity production module 310 calculates the start time of each ITV for each such associated iSeqs. The start time of each ITV event X for iSeq X can be calculated as ITV event X start time=Ad Avail Start Time+SUM (Ad Spot Duration for all linear advertisements preceding the associated linear advertisement of the iSeq X in the Ad Avail)+an execution offset for the iSeq X. The execution offset for the iSeq X can be specified by the operator 330 and can correspond to a delay for interactivity relative to the start of the associated linear advertisement. For example, for a linear advertisement advertising a new car, the execution offset can delay display of a Click-to-Call interactive advertisement 15 seconds into the car advertisement, to allow a viewer to call a local car dealer.

At stage 416, the interactivity production module 310 forwards an activation message with the start time calculated for each ITV event for each iSeq to be synchronized with a spot for an associated linear advertisement in the Ad Avail in the Ad Window associated with the cue message, as shown in Step H of FIG. 5. Each activation message is forwarded to the interactivity gateway 360 and specifies the start time calculated for the respective ITV event. The interactivity production module 310 forwards the activation message in real time, for example, within a second of receiving the respective cue message.

The interactivity gateway 360 can forward the received activation message to the interactivity server. In some implementations, the activation message is forwarded from the interactivity production module 310 to the interactivity server without passing through the interactivity gateway 360. In some implementations, the interactivity server updates the start time calculated for each ITV to account for an end-to-end media delay through the mobile broadcast network. The end-to-end media delay ensures that the iSeq of the ITV event is played in synchronization with the associated linear advertisement at the receiving mobile device. The updated start time is the start time calculated at stage 414 plus the end-to-end system delay from the time the media stream is received from the content provider at the network operations center to the time the media stream would be received at the mobile device.

In some scenarios, insertion of a linear advertisement may fail on the automation module 350 for some reason (e.g., a problem with the audio/video feed). In such a scenario, the linear advertisement is not played and hence interactivity associated with the linear advertisement should not be displayed. Typically, the insertion failure happens at the time when the linear advertisement is being inserted in the real-time media feed at the network operations center, which implies that a cue message has already been sent to the interactivity production module 310. The automation module 350 sends a cue cancel message to the interactivity production module 310 if insertion of a linear advertisement fails. An example cue cancel message from the automation module 350 includes the parameters listed in Table 2.

TABLE 2

Automation Module Cue Cancel Message Parameters

| Attribute | Mandatory | Description |
| --- | --- | --- |
| Network Name | Yes | Unique identifier for the mobile broadcast network service |
| Ad Avail Start Time | Yes | Start time in UNIX time format for the Ad Avail. Same Ad Avail Start Time sent in cue message. |
| Ad Avail Index | Yes | Index of the Ad Avail record in the Ad Window record. Same Ad Avail Index sent in cue message. |
| Ad Spot Index | Yes | Index of the failed Ad Spot in the Ad Avail. |

After receiving the cue cancel message from the automation module 350, the interactivity production module 310 associates the cue cancel message with an Ad Avail record 620 (i.e., an advertisement slot) in an Ad Window record 610 of the advertisement schedule 600 of the mobile broadcast network service, as indicated by the network name. The associated (i.e., the matching) Ad Window record 610 is the one which specifies the Ad Window Start Time and the Ad Window Duration that can include the Ad Avail Start Time indicated in the cue cancel message. The interactivity production module 310 determines if there is an iSeq created for the linear advertisement of the Ad Spot record 630 indicated by the Ad Spot Index of the Ad Avail record 620 indicated by the Ad Avail Index of the cue cancel message.

If there is such an iSeq and a start time was calculated for the ITV for the iSeq at stage 414, the interactivity production module 310 can cancel the ITV by forwarding a cancelation message (e.g., a cancel iSeq notification message) to the interactivity server, e.g., via the interactivity gateway 360. The interactivity production module 310 forwards the cancelation message in real time, for example, within a second of receiving the respective cue cancel message. In some implementations, the interactivity production module 310 also forwards a cancelation message to the interactivity server when an instruction to cancel the iSeq is received from the operator 330.

If there is no iSeq created for the linear advertisement of the Ad Spot record 630 of the cue cancel message, the interactivity production module 310 can ignore the cue cancel message. Likewise, if the interactivity production module 310 does not associate the cue cancel message with an Ad Window record 610 (i.e., if no matching Ad Window record 610 is found), the interactivity production module 310 can ignore the cue cancel message.

FIG. 4 refers to standalone iSeq(s), although the described techniques also generally apply to recurring iSeqs. For example, the interactivity production module 310 can enable the operator 330 to configure an iSeq template for supporting interactivity for recurring instances of a linear advertisement by specifying the linear advertisement Ad ID for the iSeq template. The interactivity production module 310 can create automatically iSeq instances for the iSeq template for spots for the linear advertisement that have the matching Ad ID specified for the iSeq template. If a network name is also specified for the iSeq template, the interactivity production module 310 can determine the spots for creating automatically the iSeq instances as the spots having the matching Ad ID and the matching network name. The operator 330 can cancel a previously created iSeq instance.

When the interactivity production module 310 receives new or updated advertisement schedule information from the traffic module 320, the interactivity production module 310 can create automatically iSeq instances for the iSeq template for spots for the linear advertisement in the new or updated advertisement schedule, where the spots have the matching Ad ID and the matching network name, if specified for the iSeq template. The new or updated advertisement schedule may or may not have the same spots as the present advertisement schedule. For the spots for the linear advertisement in the present advertisement schedule that are not included as spots in the new or updated advertisement schedule, the interactivity production module 310 can cancel automatically the iSeq instances previously created for those spots. The interactivity production module 310 can forward a cancelation message to the interactivity server when an iSeq instance is canceled automatically.

Traffic Module Ad Schedule File Format and Export

Figure 7C:
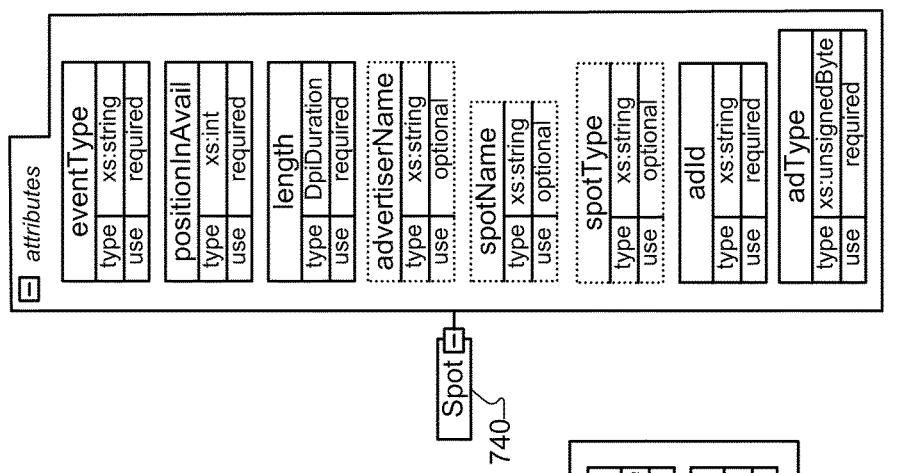
FIGS. 7A-7C illustrate exemplary file format definitions for an advertisement schedule including an advertisement schedule element, window and advertisement slot elements, and an advertisement spot element, respectively.
Figure 7B:
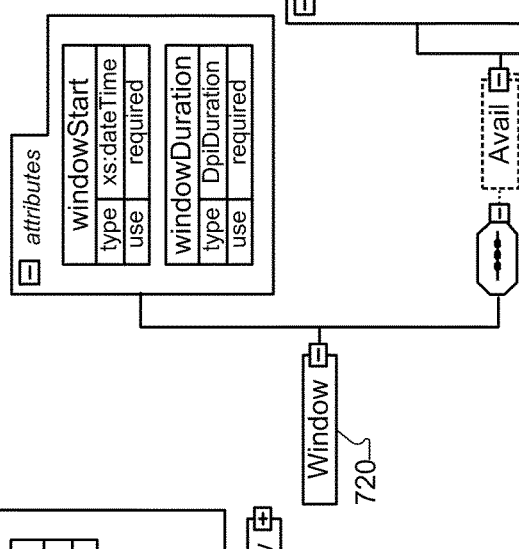
Figure 7A:
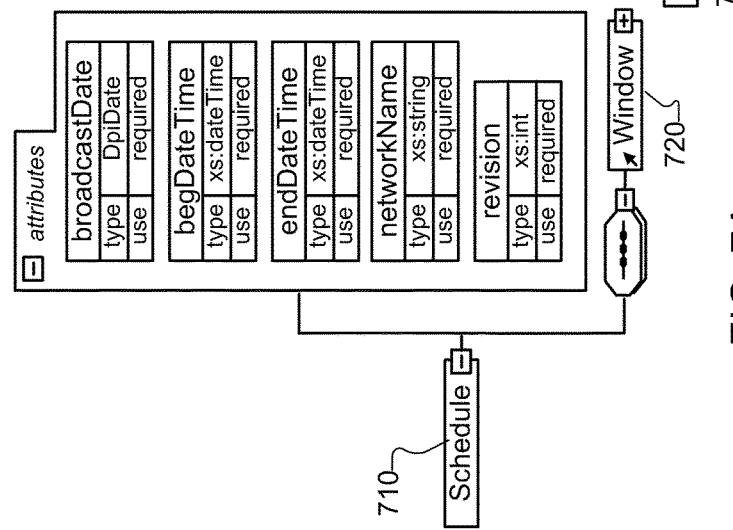

Referring to FIGS. 7A-7C, with further reference to FIG. 6, exemplary file format definitions for an advertisement schedule including an advertisement schedule element 710, window and advertisement slot (i.e., Avail) elements 720 and 730, and an advertisement spot element 740, respectively, are shown. In some implementations, the file format definitions for the advertisement schedule include additional or different elements. The elements of FIGS. 7A-7C and other elements (not shown) can include additional or different attributes.

The advertisement schedule 600 of FIG. 6 is provided by the traffic module 320 to components of the mobile broadcast network, for example, through asynchronous file system access. For each service of the mobile broadcast network, the traffic module 320 can generate an advertisement schedule 600, for example, in Extensible Markup Language (XML) format and store the advertisement schedule 600 in a predefined location. The components, including the interactivity production module 310, can retrieve the advertisement schedule 600 from the provisioned storage location.

As shown in FIG. 7A, the advertisement schedule 600 can be defined in XML format with an advertisement schedule element 710 as the root element. The advertisement schedule element 710 includes attributes for a broadcastDate, a begDateTime, an endDateTime, a networkName, and a revision.

The broadcastDate attribute provides the starting date in Coordinated Universal Time (UTC) for which the advertisement schedule element 710 describes the advertisement schedule. The broadcastDate field is defined as the DpiDate type, for example, in the form of an eight digit integer representing YYYYMMDD. The begDateTime attribute provides the exact starting date and time of the advertisement schedule 600 in xs:dateTime format. The endDateTime attribute provides the exact ending date and time of the advertisement schedule 600 in xs:dateTime format. The networkName attribute provides the unique mobile broadcast network service name to which the advertisement schedule 600 belongs. The revision attribute provides the version of the advertisement schedule 600 file starting from 1.

As shown in FIG. 7A, the advertisement schedule element 710 can contain one or more window elements 720. FIG. 7B provides the schema definition for a window element 720. The window element 720 includes attributes for a windowStart and a windowDuration. The windowStart attribute provides the start time (i.e., the Ad Window Start Time), in xs:dateTime format, of the Ad Window record 610 for advertisement slots to occur. The windowDuration attribute provides the duration (i.e., the Ad Window Duration) of the Ad Window record 610. The windowDuration field is defined as DpiDuration type, in the form of an eight digit integer representing HHMMSSCC.

As shown in FIG. 7B, the window element 720 can contain zero or more advertisement slot elements 730 (shown as Avail elements), each of which describes an Ad Avail record 620 within the Ad Window record 610. FIG. 7B provides the schema definition for a slot element 730, which includes attributes for an availStart and an availInWindow. The availStart attribute provides the approximate date and time, in xs:dateTime format, for the Ad Avail record 620 to start. The availStart time is within the window period as defined by the windowStart and the windowDuration attributes of the parent window element 720. The availInWindow attribute provides the Ad Avail Index, starting from 1, for the Ad Avail record 620 within the Ad Window record 610.

As shown in FIG. 7B, the advertisement slot element 730 can contain zero or more advertisement spot elements 740, each of which describes an Ad Spot record 630 within the Ad Avail record 620. FIG. 7C provides the schema definition for an advertisement spot element 740. The advertisement spot element 740 includes attributes for an eventType, a positionInAvail, a length, an advertiserName, a spotName, a spotType, an adID, and an adType.

The eventType attribute provides the type of event defined by the Ad Spot record 630. Supported event types can include the following: local originated insertion (i.e., LOI); remark, no action (i.e., REM); last record (i.e., END), and ignore break cue (i.e., NUL). The positionInAvail attribute provides the Ad Spot Index, starting from 1, of the Ad Spot record 630 in the Ad Avail record 620. The length attribute provides the Ad Spot Duration of the Ad Spot record 630. The length field is defined as DpiDuration type, in the form of an eight digit integer representing HHMMSSCC. The adID attribute provides the Ad ID of the linear advertisement to be played on the Ad Spot record 630, as identified by the traffic module 320. The adType attribute provides the type of the Ad Spot record 630. Supported adType values can include 0, to indicate that the linear advertisement is not enabled for interactivity, and 1, to indicate that the linear advertisement is enabled for interactivity. All other values of the adType can be reserved for future use.

The advertisement spot element 740 can include optional attributes, including the advertiserName, the spotName, and the spotType. The advertiserName attribute can provide the name of the advertiser of the Ad Spot record 630, as identified by the traffic module 320. The spotName attribute can provide the advertiser's spot name, as identified by the traffic module 320. The spotType attribute can provide the type of the Ad Spot record 630. Supported values for the spotType attribute can include SCHED, for an advertisement spot scheduled contractually, and FILL, for a filler advertisement spot to complete an advertisement break.

Considerations Regarding the Description

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), a digital signal processing device (DSPD), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software executed by a processor, firmware, or any combination thereof. If implemented in software executed by a processor, the functions may be stored on or transmitted over as one or more instructions or code on a computer-readable medium. Computer-readable media includes both tangible and/or non-transitory computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of computer-readable media.

The previous description is provided to enable any person skilled in the art to make and/or use the apparatus, systems, and methods described. Various modifications to the disclosure will be readily apparent to those skilled in the art, and the generic principles defined herein may be applied to other variations without departing from the spirit or scope of the disclosure. Thus, the disclosure is not to be limited to the examples and designs described herein, but rather, is to be accorded the widest scope consistent with the principles and novel features disclosed herein.

The invention claimed is:

1. A communications system configured to synchronize interactive content with linear advertisements, comprising:
   a traffic module, executing on at least one processor, configured to generate advertisement schedule information for linear advertisements on one or more channels of the communications system, wherein the advertisement schedule information defines one or more scheduling windows of time, each window having a window start time and a window duration, each window specifying one or more advertising slots having unknown start times, each advertising slot being specified by an index;

an automation module, executing on the at least one processor, communicatively coupled to the traffic module and configured to detect one or more cue messages in a real-time media stream being transmit over a broadcast network, each cue message indicating a respective start time and a respective index of a respective slot in the real-time media stream for one or more respective linear advertisements, and to forward information about the one or more cue messages;

an interactivity production module, executing on the at least one processor, communicatively coupled to the traffic module and the automation module and configured to receive the advertisement schedule information from the traffic module, to present an operator interface through which the interactive content is associated with the one or more advertising slots at an offset defined in the advertisement schedule information, to receive the information about the one or more cue messages from the automation module, and the interactivity production module further configured to synchronize activation of the interactive content with the one or more linear advertisements in the real-time media stream played on a receiving mobile device by determining which one of the advertising slots in one of the scheduling windows defined in the advertisement schedule information corresponds with the respective start time and the respective index of the respective slot indicated by a respective cue message, calculating a start time for an interactivity event of the interactive content associated with the determined advertising slot based on the respective start time indicated by the respective cue message and the offset identified in the advertising schedule information for the interactive content, and generating an activation message with the start time for the interactivity event in response to calculating the start time for the interactivity event; and an interactivity server, executing on the at least one processor, communicatively coupled to the interactivity production module and configured to receive the activation message from the interactivity production module, and the interactivity server further configured to synchronize the activation of the interactive content with the one or more linear advertisements in the real-time media stream played on the receiving mobile device by calculating an updated start time for the interactivity event by adjusting the start time in the activation message with an added media delay associated with transmission of the real-time media stream over a mobile broadcast network to the receiving mobile device, modifying the activation message in response to calculating the updated start time for the interactivity event of the interactive content to replace the start time for the interactivity event with the updated start time to trigger activation of the interactive content on the receiving mobile device in synchronization with the one or more linear advertisements in the real-time media stream delivered over the broadcast network and played on the receiving mobile device, and transmitting the activation message over the broadcast network that activates the interactive content on the receiving mobile device at the updated start time, wherein the receiving mobile device is configured to receive the activation message transmitted over the broadcast network and activate the interactive content at the updated start time included in the activation message.

2. The system of claim 1, wherein the interactivity production module is further configured to receive information about one or more interactive sequences, each interactive sequence to be synchronized with a respective spot for an associated linear advertisement, to generate the interactivity event for each respective interactive sequence.

3. The system of claim 1, wherein:
the interactivity production module is further configured to calculate the start time for the interactivity event for each respective interactive sequence to be synchronized with a respective spot for an associated linear advertisement in the respective slot for linear advertisements in the respective window of the advertisement schedule.

4. The system of claim 3, wherein the advertisement schedule information indicates that the interactive sequence is played on top of a spot for a linear advertisement by indicating a type of the spot as interactive.

5. The system of claim 3, wherein the interactivity production module is configured to calculate the start time for each respective interactivity event for each respective interactive sequence to be synchronized with the respective spot for the associated linear advertisement using an offset, specified by an operator, from a respective start time of the respective spot for the associated linear advertisement.

6. The system of claim 1, wherein the interactivity production module is further configured to enable an operator to associate an interactive sequence with a respective linear advertisement, to enable the operator to create a scene template for the interactive sequence, to enable the operator to specify timing information for the interactive sequence, to generate the interactivity event for the interactive sequence using the scene template and the specified timing information, and to forward information about the interactive sequence after the operator indicates that the interactive sequence is ready to distribute.

7. The system of claim 6, wherein the interactivity production module is configured to enable the operator to associate the interactive sequence with the respective linear advertisement if a spot for the respective linear advertisement in the advertisement schedule information has an interactive type.

8. The system of claim 6, wherein the interactivity production module is further configured to forward updated information about an updated interactive sequence to an interactivity server.

9. The system of claim 6, wherein the scene template for the interactive sequence includes one or more of Click-to-SMS, Click-for-Info, Click-to-Web, and Click-to-Call templates.

10. The system of claim 6, wherein the interactivity production module is further configured to enable the operator to configure the interactive sequence for supporting interactivity with a single instance of the associated linear advertisement.

11. The system of claim 6, wherein the interactivity production module is further configured to enable the operator to cancel a previously created interactive sequence.

12. The system of claim 6, wherein the interactivity production module is further configured to enable the operator to configure an interactive sequence template for supporting interactivity for recurring instances of the associated linear advertisement by specifying a linear advertisement identifier for the interactive sequence template.

13. The system of claim 12, wherein the interactivity production module is further configured to create automatically interactive sequence instances for the interactive sequence template for spots for the associated linear advertisement in the advertisement schedule information, the spots having a linear advertisement identifier that matches the linear advertisement identifier specified for the interactive sequence template.

14. The system of claim 13, wherein a network name is specified for the interactive sequence template; and
the interactivity production module is further configured to determine the spots for creating automatically the interactive sequence instances as the spots having a linear advertisement identifier that matches the linear advertisement identifier specified for the interactive sequence template and a network name that matches the network name specified for the interactive sequence template.

15. The system of claim 13, wherein the interactivity production module is further configured to enable the operator to cancel a previously created interactive sequence instance for the interactive sequence template.

16. The system of claim 13, wherein the interactivity production module is configured to create automatically interactive sequence instances for the interactive sequence template when new or updated advertisement schedule information is received from the traffic module for spots for the associated linear advertisement in the new or updated advertisement schedule, the spots having a linear advertisement identifier that matches the linear advertisement identifier specified for the interactive sequence template.

17. The system of claim 16, wherein the interactivity production module is further configured to cancel automatically interactive sequence instances previously created for the interactive sequence template for spots for the associated linear advertisement in a present advertisement schedule that are not included as spots for the associated linear advertisement in the new or updated advertisement schedule.

18. The system of claim 1, wherein the automation module is further configured to generate a cue cancel message when insertion of a linear advertisement fails, and to forward the cue cancel message to the interactivity production module.

19. The system of claim 1, wherein the interactivity production module is further configured to forward a cancelation message to an interactivity server to cancel the interactivity event based on a cue cancel message received from the automation module, an instruction to cancel an interactive sequence received from an operator, or automatic cancelation of an interactive sequence instance.

20. A method of synchronizing interactive content with linear advertisements in a communications system, the method comprising:
receiving, by at least one processor, advertisement schedule information for linear advertisements on one or more channels of the communications system, wherein the advertisement schedule information defines one or more scheduling windows of time, each window having a window start time and a window duration, each window specifying one or more advertising slots having unknown start times, each advertising slot being specified by an index;
presenting, by the at least one processor, an operator interface through which the interactive content is associated with the one or more advertising slots at an offset defined in the advertisement schedule information;
receiving, by the at least one processor, information about one or more cue messages, the one or more cue messages detected in a real-time media stream being transmit over a broadcast network, each cue message indicating a respective start time and a respective index of a respective slot in the real-time media stream for one or more respective linear advertisements; and
synchronizing, by the at least one processor, activation of the interactive content with the one or more linear advertisements in the real-time media stream played on a receiving mobile device by:
determining, by the at least one processor, which one of the advertising slots in one of the scheduling windows defined in the advertisement schedule information corresponds to the respective start time and the respective index of the respective slot indicated by a respective cue message;
calculating, by the at least one processor, a start time for an interactivity event of the interactive content associated with the determined advertising slot based on the respective start time indicated by the respective cue message and the offset identified in the advertising schedule information for the interactive content;
in response to calculating the start time for the interactivity event, generating, by the at least one processor, an activation message with the start time for the interactivity event;
calculating, by the at least one processor, an updated start time for the interactivity event by adjusting the start time in the activation message with an added media delay associated with transmission of the real-time media stream over the broadcast network to the receiving mobile device;
in response to calculating the updated start time for the interactivity event of the interactive content, modifying the activation message to replace the start time for the interactivity event with the updated start time to trigger activation of the interactive content on the receiving mobile device in synchronization with the one or more linear advertisements in the real-time media stream delivered over the broadcast network and played on the receiving mobile device; and
transmitting, by the at least one processor, the activation message over the broadcast network that activates the interactive content on the receiving mobile device at the updated start time, wherein the receiving mobile device is configured to receive the activation message transmitted over the broadcast network and activate the interactive content at the updated start time included in the activation message.

21. The method of claim 20, further comprising:
receiving, by the at least one processor, information about one or more interactive sequences, each interactive sequence to be synchronized with a respective spot for an associated linear advertisement; and
generating, by the at least one processor, the interactivity event for each respective interactive sequence.

22. The method of claim 20, wherein:
calculating the start time for the interactivity event comprises calculating the start time for each respective interactivity event for each respective interactive sequence to be synchronized with a respective spot for an associated linear advertisement in the respective slot for linear advertisements in the respective window of the advertisement schedule, the respective slot associated with the respective cue message.

23. The method of claim 22, wherein the advertisement schedule information indicates the interactive sequence is played on top of a spot for a linear advertisement by indicating a type of the spot as interactive.

24. The method of claim 22, wherein calculating the start time for each respective interactivity event comprises calculating the start time for each respective interactivity event for each respective interactive sequence to be synchronized with the respective spot for the associated linear advertisement using an offset, specified by an operator, from a respective start time of the respective spot for the associated linear advertisement.

25. The method of claim 20, further comprising:
enabling an operator to associate an interactive sequence with a respective linear advertisement;
enabling the operator to create a scene template for the interactive sequence;
enabling the operator to specify timing information for the interactive sequence; and
forwarding information about the interactive sequence after the operator indicates that the interactive sequence is ready to distribute; and
generating the interactivity event for the interactive sequence using the scene template and the specified timing information.

26. The method of claim 25, wherein enabling the operator to associate the interactive sequence with the respective linear advertisement further comprises enabling the operator to associate the interactive sequence with the respective linear advertisement if a spot for the respective linear advertisement in the advertisement schedule information has an interactive type.

27. The method of claim 25, further comprising forwarding updated information about an updated interactive sequence.

28. The method of claim 25, wherein the scene template for the interactive sequence includes one or more of Click-to-SMS, Click-for-Info, Click-to-Web, and Click-to-Call templates.

29. The method of claim 25, further comprising enabling the operator to configure the interactive sequence for supporting interactivity with a single instance of the associated linear advertisement.

30. The method of claim 25, further comprising enabling the operator to cancel a previously created interactive sequence.

31. The method of claim 25, further comprising enabling the operator to configure an interactive sequence template for supporting interactivity for recurring instances of the associated linear advertisement by specifying a linear advertisement identifier for the interactive sequence template.

32. The method of claim 31, further comprising creating automatically interactive sequence instances for the interactive sequence template for spots for the associated linear advertisement in the advertisement schedule information, the spots having a linear advertisement identifier that matches the linear advertisement identifier specified for the interactive sequence template.

33. The method of claim 32, wherein
a network name is specified for the interactive sequence template; and
the method further comprises determining the spots for creating automatically the interactive sequence instances as the spots having a linear advertisement identifier that matches the linear advertisement identifier specified for the interactive sequence template and a network name that matches the network name specified for the interactive sequence template.

34. The method of claim 32, further comprising enabling the operator to cancel a previously created interactive sequence instance for the interactive sequence template.

35. The method of claim 32, wherein creating automatically interactive sequence instances comprises creating automatically interactive sequence instances for the interactive sequence template when new or updated advertisement schedule information is received for spots for the associated linear advertisement in the new or updated advertisement schedule, the spots having a linear advertisement identifier that matches the linear advertisement identifier specified for the interactive sequence template.

36. The method of claim 35, further comprising canceling automatically interactive sequence instances previously created for the interactive sequence template for spots for the associated linear advertisement in a present advertisement schedule that are not included as spots for the associated linear advertisement in the new or updated advertisement schedule.

37. The method of claim 20, further comprising receiving a cue cancel message generated when insertion of a linear advertisement fails.

38. The method of claim 20, further comprising forwarding a cancelation message to cancel the interactivity event based on a received cue cancel message, an instruction to cancel an interactive sequence received from an operator, or automatic cancelation of an interactive sequence instance.

39. A non-transitory processor-readable storage medium storing processor-readable having stored thereon processor-executable instructions configured to cause a processor to perform the operations comprising:
receiving advertisement schedule information for linear advertisements on one or more channels of the communications system, wherein the advertisement schedule information defines one or more scheduling windows of time, each window having a window start time and a window duration, each window specifying one or more advertising slots having unknown start times, each advertising slot being specified by an index;
presenting an operator interface through which the interactive content is associated with the one or more advertising slots at an offset defined in the advertisement schedule information;
receiving information about one or more cue messages, the one or more cue messages detected in a real-time media stream being transmit over a broadcast network, each cue message indicating a respective start time and a respective index of a respective slot in the real-time media stream for one or more respective linear advertisements; and
synchronizing, by the at least one processor, activation of the interactive content with the one or more linear advertisements in the real-time media stream played on a receiving mobile device by:
determining which one of the advertising slots in one of the scheduling windows defined in the advertisement schedule information corresponds to the respective start time and the respective index of the respective slot indicated by a respective cue message;
calculating a start time for an interactivity event of the interactive content associated with the determined advertising slot based on the respective start time indicated by the respective cue message and the offset identified in the advertising schedule information for the interactive content;

in response to calculating the start time for the interactivity event, generating an activation message with the start time for the interactivity event;

calculating an updated start time for the interactivity event by adjusting the start time in the activation message with an added media delay associated with transmission of the real-time media stream over the broadcast network to the receiving mobile device;

in response to calculating the updated start time for the interactivity event of the interactive content, modifying the activation message to replace the start time for the interactivity event with the updated start time to trigger activation of the interactive content on the receiving mobile device in synchronization with the one or more linear advertisements in the real-time media stream delivered over the broadcast network and played on the receiving mobile device; and transmitting the activation message over the broadcast network that activates the interactive content on the receiving mobile device at the updated start time, wherein the receiving mobile device is configured to receive the activation message transmitted over the broadcast network and activate the interactive content at the updated start time included in the activation message.

40. The processor-readable storage medium of claim 39, wherein the stored processor-executable instructions are configured to cause the processor to perform operations further comprising:

receiving information about one or more interactive sequences, each interactive sequence to be synchronized with a respective spot for an associated linear advertisement; and generating the interactivity event for each respective interactive sequence.

41. The processor-readable storage medium of claim 39, wherein the stored processor-executable instructions are configured to cause the processor to perform operations further comprising:

calculating the start time for the interactivity event for each respective interactive sequence to be synchronized with a respective spot for an associated linear advertisement in the respective slot for linear advertisements in the respective window of the advertisement schedule, the respective slot associated with the respective cue message.

42. The processor-readable storage medium of claim 41, wherein the advertisement schedule indicates that the interactive sequence is played on top of a spot for a linear advertisement by indicating a type of the spot as interactive.

43. The processor-readable storage medium of claim 41, wherein the stored processor-executable instructions are configured to cause the processor to perform operations further comprising:

calculating the start time for each respective interactivity event for each respective interactive sequence to be synchronized with the respective spot for the associated linear advertisement using an offset, specified by an operator, from a respective start time of the respective spot for the associated linear advertisement.

44. The processor-readable storage medium of claim 39, wherein the stored processor-executable instructions are configured to cause the processor to perform operations further comprising:

enabling an operator to associate an interactive sequence with a respective linear advertisement;

enabling the operator to create a scene template for the interactive sequence;

enabling the operator to specify timing information for the interactive sequence; and forwarding information about the interactive sequence after the operator indicates that the interactive sequence is ready to distribute; and generating the interactivity event for the interactive sequence using the scene template and the specified timing information.

45. The processor-readable storage medium of claim 44, wherein the stored processor-executable instructions are configured to cause the processor to perform operations further comprising:

enabling the operator to associate the interactive sequence with the respective linear advertisement if a spot for the respective linear advertisement in the advertisement schedule information has an interactive type.

46. The processor-readable storage medium of claim 44, wherein the stored processor-executable instructions are configured to cause the processor to perform operations further comprising:

forwarding updated information about an updated interactive sequence.

47. The processor-readable storage medium of claim 44, wherein the scene template for the interactive sequence includes one or more of Click-to-SMS, Click-for-Info, Click-to-Web, and Click-to-Call templates.

48. The processor-readable storage medium of claim 44, wherein the stored processor-executable instructions are configured to cause the processor to perform operations further comprising:

enabling the operator to configure the interactive sequence for supporting interactivity with a single instance of the associated linear advertisement.

49. The processor-readable storage medium of claim 44, wherein the stored processor-executable instructions are configured to cause the processor to perform operations further comprising:

enabling the operator to cancel a previously created interactive sequence.

50. The processor-readable storage medium of claim 44, wherein the stored processor-executable instructions are configured to cause the processor to perform operations further comprising:

enabling the operator to configure an interactive sequence template for supporting interactivity for recurring instances of the associated linear advertisement by specifying a linear advertisement identifier for the interactive sequence template.

51. The processor-readable storage medium of claim 50, wherein the stored processor-executable instructions are configured to cause the processor to perform operations further comprising:

creating automatically interactive sequence instances for the interactive sequence template for spots for the associated linear advertisement in the advertisement schedule information, the spots having a linear advertisement identifier that matches the linear advertisement identifier specified for the interactive sequence template.

52. The processor-readable storage medium 51, wherein a network name is specified for the interactive sequence template; and the stored processor-executable instructions are configured to cause the processor to perform operations further comprising:

determining the spots for creating automatically the interactive sequence instances as the spots having a linear advertisement identifier that matches the linear advertisement identifier specified for the interactive sequence template and a network name that matches the network name specified for the interactive sequence template.

53. The processor-readable storage medium of claim 51, wherein the stored processor-executable instructions are configured to cause the processor to perform operations further comprising:

enabling the operator to cancel a previously created interactive sequence instance for the interactive sequence template.

54. The processor-readable storage medium of claim 51, wherein the stored processor-executable instructions are configured to cause the processor to perform operations further comprising:

creating automatically interactive sequence instances for the interactive sequence template when new or updated advertisement schedule information is received for spots for the associated linear advertisement in the new or updated advertisement schedule, the spots having a linear advertisement identifier that matches the linear advertisement identifier specified for the interactive sequence template.

55. The processor-readable storage medium of claim 54, wherein the stored processor-executable instructions are configured to cause the processor to perform operations further comprising:

cancelling automatically interactive sequence instances previously created for the interactive sequence template for spots for the associated linear advertisement in a present advertisement schedule that are not included as spots for the associated linear advertisement in the new or updated advertisement schedule.

56. The processor-readable storage medium of claim 39, wherein the stored processor-executable instructions are configured to cause the processor to perform operations further comprising:

receiving a cue cancel message generated when insertion of a linear advertisement fails.

57. The processor-readable storage medium of claim 39, wherein the stored processor-executable instructions are configured to cause the processor to perform operations further comprising:

forwarding a cancelation message to cancel an interactivity event based on a received cue cancel message, an instruction to cancel an interactive sequence received from an operator, or automatic cancelation of an interactive sequence instance.

* * * * *